(12) United States Patent
Paul et al.

(10) Patent No.: US 12,228,538 B2
(45) Date of Patent: Feb. 18, 2025

(54) MOISTURE SENSOR HAVING INTEGRATED HEATING ELEMENT

(71) Applicant: QUALCOMM Incorporated, San Diego, CA (US)

(72) Inventors: Abhijeet Paul, Escondido, CA (US); Mishel Matloubian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 152 days.

(21) Appl. No.: 18/189,494

(22) Filed: Mar. 24, 2023

(65) Prior Publication Data

US 2024/0319127 A1 Sep. 26, 2024

(51) Int. Cl.
G01N 27/22 (2006.01)

(52) U.S. Cl.
CPC ......... *G01N 27/225* (2013.01); *G01N 27/228* (2013.01)

(58) Field of Classification Search
CPC ... G01N 27/225; G01N 27/228; G01N 27/223
USPC ................ 324/667, 664, 663, 658, 649, 600
See application file for complete search history.

(56) References Cited

U.S. PATENT DOCUMENTS

| | | | |
|---|---|---|---|
| 7,571,637 B2 | 8/2009 | Chen et al. | |
| 8,007,167 B2 | 8/2011 | Cummins | |
| 8,739,622 B2 | 6/2014 | Grange et al. | |
| 9,793,220 B2 | 10/2017 | Barth et al. | |
| 10,502,702 B2 | 12/2019 | Hong | |
| 11,422,105 B2* | 8/2022 | Miyatake | H01L 23/5222 |
| 2013/0139587 A1 | 6/2013 | Le Neel et al. | |
| 2020/0158676 A1* | 5/2020 | Inoue | G01N 27/223 |
| 2021/0190716 A1* | 6/2021 | Shiraki | G01N 27/226 |

FOREIGN PATENT DOCUMENTS

| | | |
|---|---|---|
| CN | 115308274 A | 11/2022 |
| WO | 2005095936 A1 | 10/2005 |
| WO | 2019001776 A1 | 1/2019 |

OTHER PUBLICATIONS

International Search Report and Written Opinion—PCT/US2024/015561—ISA/EPO—May 3, 2024.

* cited by examiner

*Primary Examiner* — Giovanni Astacio-Oquendo
(74) *Attorney, Agent, or Firm* — Muncy, Geissler, Olds & Lowe

(57) ABSTRACT

In an aspect, a device includes: a first patterned metal layer; a first dielectric layer disposed over the first patterned metal layer; a second patterned metal layer disposed over the first dielectric layer, wherein the first patterned metal layer, the first dielectric layer, and the second patterned metal layer form a first capacitor; a second moisture-sensitive dielectric layer disposed over the second patterned metal layer; and a third patterned metal layer disposed over the second moisture-sensitive dielectric layer, wherein the third patterned metal layer, the second moisture-sensitive dielectric layer, and the second patterned metal layer form a second capacitor that is moisture-sensitive, and the first patterned metal layer is further configured as a heating element to assist in removing moisture from the second moisture-sensitive dielectric layer of the second capacitor in response to provision of an electrical power to the first patterned metal layer.

34 Claims, 16 Drawing Sheets

MOISTURE SENSOR HAVING INTEGRATED HEATING ELEMENT

FIELD OF DISCLOSURE

The present disclosure relates generally to semiconductor devices including electronic devices incorporating the semiconductor devices, and more specifically, but not exclusively, to moisture-sensing devices and fabrication techniques thereof.

BACKGROUND

Integrated circuit technology has achieved great strides in advancing computing power through miniaturization of active components. The various packaging technologies such can be found in many electronic devices, including processors, servers, radio frequency (RF) integrated circuits, etc. Advanced packaging and processing techniques allow for complex devices, such as multi-die devices and system on a chip (SOC) devices, which, may include multiple function blocks, with each function block designed to perform a specific function, such as, for example, a microprocessor function, a graphics processing unit (GPU) function, a communications function (e.g., Wi-Fi, Bluetooth, and other communications), and the like.

Moisture sensors may be constructed using integrated circuit processing technologies. In certain scenarios, such moisture sensors may be used to detect the humidity of an ambient environment or may be configured with respect to other components of an integrated circuit to detect humidity levels that may damage the integrated circuit. In the latter scenario, the moisture sensor may be used to provide a humidity warning before the integrated circuit or components controlled by the integrated circuit suffer failure due to the humid conditions.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a device includes: a first patterned metal layer; a first dielectric layer disposed over the first patterned metal layer; a second patterned metal layer disposed over the first dielectric layer, wherein the first patterned metal layer, the first dielectric layer, and the second patterned metal layer form a first capacitor; a second moisture-sensitive dielectric layer disposed over the second patterned metal layer; and a third patterned metal layer disposed over the second moisture-sensitive dielectric layer, wherein the third patterned metal layer, the second moisture-sensitive dielectric layer, and the second patterned metal layer form a second capacitor, the second patterned metal layer is shared with the first capacitor, and the first patterned metal layer is further configured for connection to electrical power as a heating element to assist in removing moisture from the second moisture-sensitive dielectric layer of the second capacitor.

In an aspect, a method of forming a moisture sensor includes: forming a first patterned metal layer overlying a substrate; forming a first dielectric layer over the first patterned metal layer; forming a second patterned metal layer over the first dielectric layer; forming a second moisture-sensitive dielectric layer over the second patterned metal layer; and forming a third patterned metal layer over the second moisture-sensitive dielectric layer; wherein the first patterned metal layer, the first dielectric layer, and the second patterned metal layer form a first capacitor, the third patterned metal layer, the second moisture-sensitive dielectric layer, and the second patterned metal layer form a second capacitor, the second patterned metal layer is shared with the first capacitor, and the first patterned metal layer is further configured for connection to electrical power as a heating element to assist in removing moisture from the second moisture-sensitive dielectric layer of the second capacitor.

In an aspect, a moisture sensor includes: a first capacitor having a first patterned metal layer, a first dielectric layer disposed over the first patterned metal layer, and a second patterned metal layer disposed over the first dielectric layer; a second capacitor having a second moisture-sensitive dielectric layer disposed over the second patterned metal layer, and a third patterned metal layer disposed over the second moisture-sensitive dielectric layer, wherein the second patterned metal layer is shared with the first capacitor; a first frequency-sensitive circuit formed using at least the first capacitor and the second capacitor, wherein the first frequency-sensitive circuit has a first frequency response that changes based at least on a variable capacitance value of the second capacitor resulting from exposure of the second moisture-sensitive dielectric layer to moisture; and a heating control circuit configured to provide electrical power to the first patterned metal layer to control heating of the first patterned metal layer to assist in removing moisture from the second moisture-sensitive dielectric layer of the second capacitor.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

Figure 1A:
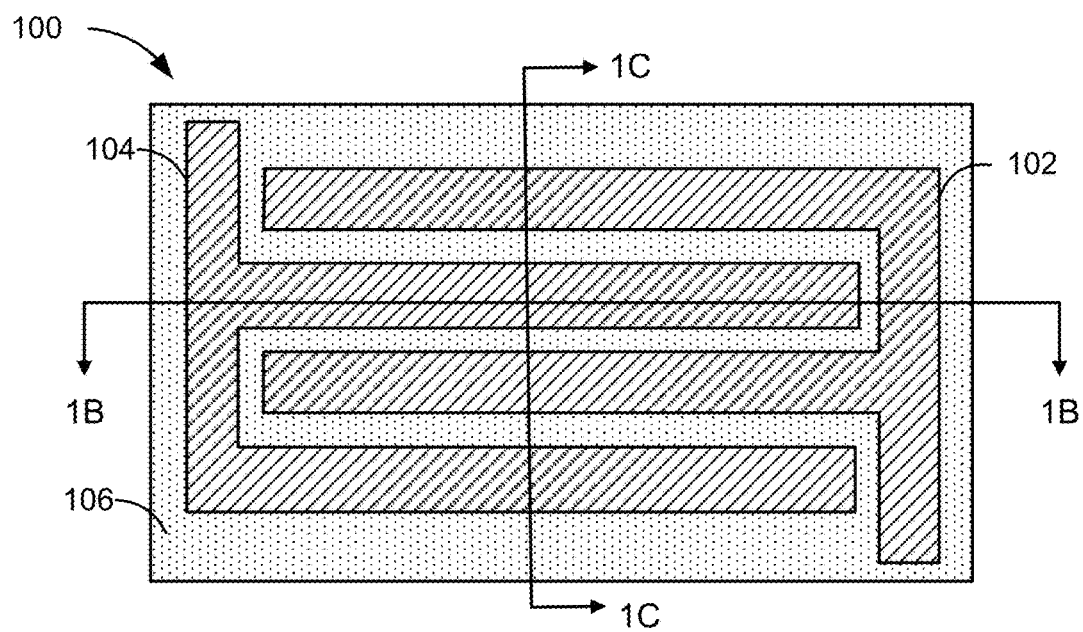
FIGS. 1A, 1B, and 1C depict various views of an example moisture sensor, according to aspects of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Aspects of the present disclosure are illustrated in the following description and related drawings directed to specific embodiments. Alternate aspects or embodiments may be devised without departing from the scope of the teachings herein. Additionally, well-known elements of the illustrative embodiments herein may not be described in detail or may be omitted so as not to obscure the relevant details of the teachings in the present disclosure.

In certain described example implementations, instances are identified where various component structures and portions of operations can be taken from known, conventional techniques, and then arranged in accordance with one or more exemplary embodiments. In such instances, internal details of the known, conventional component structures and/or portions of operations may be omitted to help avoid potential obfuscation of the concepts illustrated in the illustrative embodiments disclosed herein.

The terminology used herein is for the purpose of describing particular embodiments only and is not intended to be limiting As used herein, the singular forms "a." "an," and "the" are intended to include the plural forms as well, unless the context clearly indicates otherwise. It will be further understood that the terms "comprises," "comprising," "includes," and/or "including." when used herein, specify the presence of stated features, integers, steps, operations, elements, and/or components, but do not preclude the presence or addition of one or more other features, integers, steps, operations, elements, components, and/or groups thereof. It will also be understood that when a layer is described as "over," "overlying," "under," "underlying," another layer does not necessarily preclude the use of intermediate layers and/or materials that may otherwise be used to ensure adhesion between the layers.

In order to fully illustrate aspects of the design of the present disclosure, methods of fabrication are presented. Other methods of fabrication are possible, and discussed fabrication methods are presented only to aid understanding of the concepts disclosed herein.

Certain aspects of the disclosure are directed to moisture sensing devices formed as an integrated circuit structure. In an aspect, such moisture sensing devices may be manufactured as individual moisture sensing devices that are subsequently surface mounted to a substrate for connection with other electronic components. In an aspect, such moisture sensing devices may be manufactured in the same substrate as the other electronic components. As will be understood, various electrical connection relationships may exist between the moisture sensing devices and the other electronic components.

Figure 1B:
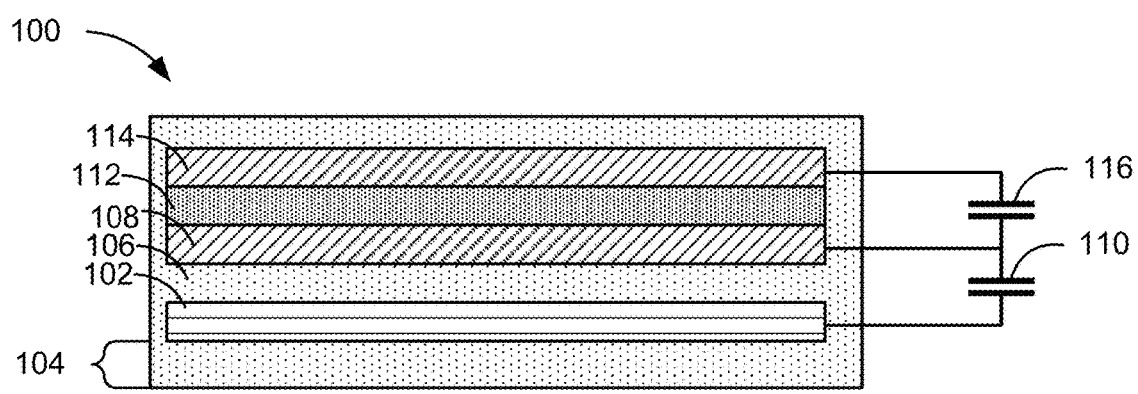
Figure 1C:
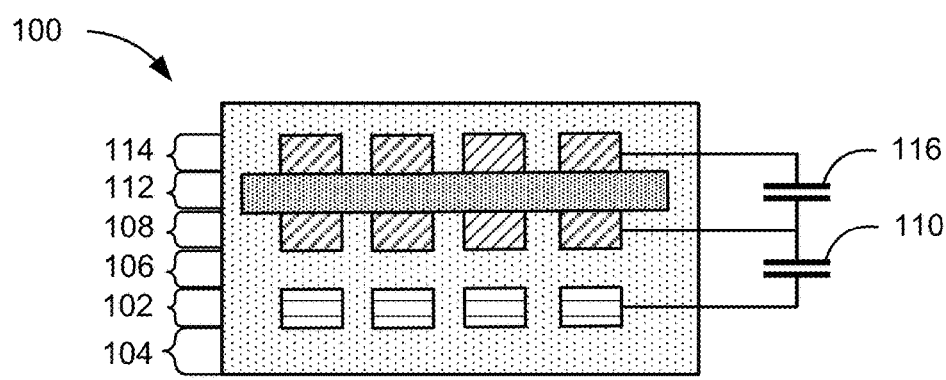

FIGS. 1A, 1B, and 1C (collectively FIG. 1) depicts various views of an example moisture sensor 100, according to aspects of the disclosure. FIG. 1A is a top cutaway view of the moisture sensor 100. FIG. 1B is a cross-sectional view of the moisture sensor 100 taken along line 1B-1B of FIG. 1A, while FIG. 1C is a cross-sectional view of the moisture sensor 100 taken along line 1C-1C.

As shown in FIG. 1, the moisture sensor 100 includes a patterned refractory metal layer 102 formed from a refractory metal (e.g., tungsten, tungsten alloy, tantalum, tantalum alloy, niobium, niobium alloy, rhenium, rhenium allow, etc.). The patterned refractory metal layer 102 may be deposited or otherwise formed on a substrate 104, such as a silicon dioxide ($SiO_2$) or silicon nitride (SiN) substrate. As will be set forth in more detail below, the patterned refractory metal layer 102 metal may serve a dual function. In an aspect, the patterned refractory metal layer 102 may form a plate of a capacitor as well as serve as a heating element for controlling the temperature of the moisture sensor 100. In FIG. 1, a dielectric material, such as $SiO_2$ or SiN, may be deposited or otherwise formed to fill the interstitial regions between the traces of the patterned refractory metal layer 102.

In an aspect, a dielectric layer 106 formed from a moisture-insensitive dielectric material overlies the patterned refractory metal layer 102. The dielectric layer 106 shown in FIG. 1 may be formed with the same dielectric material as the substrate 104. In an aspect, the dielectric material used to form the dielectric layer 106 may be a moisture-insensitive material (e.g., $SiO_2$ or SiN) in that the dielectric value of the dielectric material does not substantially vary in the presence of moisture.

In an aspect, a patterned metal layer 108 overlies the dielectric layer 106. The patterned metal layer 108 may be formed from a conductive material, such as copper, aluminum, etc. Together, the patterned refractory metal layer 102, dielectric layer 106, and the patterned metal layer 108 form a capacitor 110, shown in schematic format in FIG. 1. In this example, the capacitor 110 is formed to have a fixed capacitance value, at least in the sense that the capacitance value does not vary significantly in the presence of moisture. In FIG. 1, a dielectric material, such as $SiO_2$ or SiN, may be deposited or otherwise formed to fill the interstitial regions between the traces of the patterned metal layer 108.

In an aspect, a further dielectric layer 112 is disposed over the patterned metal layer 108. In this example, the dielectric layer 112 is formed from a moisture-sensitive dielectric material having a low dielectric constant (low-K) or extremely low dielectric constant (ELK). In an aspect, the low-K and/or ELK dielectric material may have a small dielectric constant relative to other dielectric materials (e.g., $SiO_2$, SiN, ceramics, mica, etc.) used in manufacturing integrated devices. In an aspect, the dielectric constant of such moisture-sensitive dielectric may have a dielectric value below 4.3, and often below 3.0. In an aspect, the moisture-sensitive dielectric material may be porous and/or hydrophilic to allow penetration of moisture from the ambient environment into the moisture-sensitive dielectric material. In FIG. 1, a moisture-insensitive dielectric material, such as $SiO_2$ or SiN, may be deposited or otherwise formed to fill the interstitial regions between the traces of the patterned metal layer 108.

In an aspect, a further patterned metal layer 114 overlies the dielectric layer 112 and may be formed using the same material as patterned metal layer 108. Together, the patterned metal layer 108, dielectric layer 112, and the patterned metal layer 114 form a capacitor 116, shown in schematic format in FIG. 1. The patterned metal layer 108 is shared by both the capacitor 110 and capacitor 116. In this example, the capacitor 116 has a variable capacitance value, at least in the sense that the capacitance value varies in a detectable manner in the presence of moisture. In FIG. 1, a dielectric material, such as $SiO_2$ or SiN, may be deposited or otherwise formed to fill the interstitial regions between the traces of the patterned metal layer 114.

In an aspect, the patterned refractory metal layer 102 and patterned metal layers 114 and 108 have substantially the same patterns so that the traces of the layers are aligned and have the same height and width. By using substantially the same patterns, any detectable difference between the capacitances of capacitors 110 and 116 will be principally based on the moisture content of the moisture-sensitive dielectric layer 112. In certain scenarios, capacitor 110 may serve as a reference capacitor with respect to the variable capacitance of the moisture-sensitive capacitor 116.

Figure 2A:
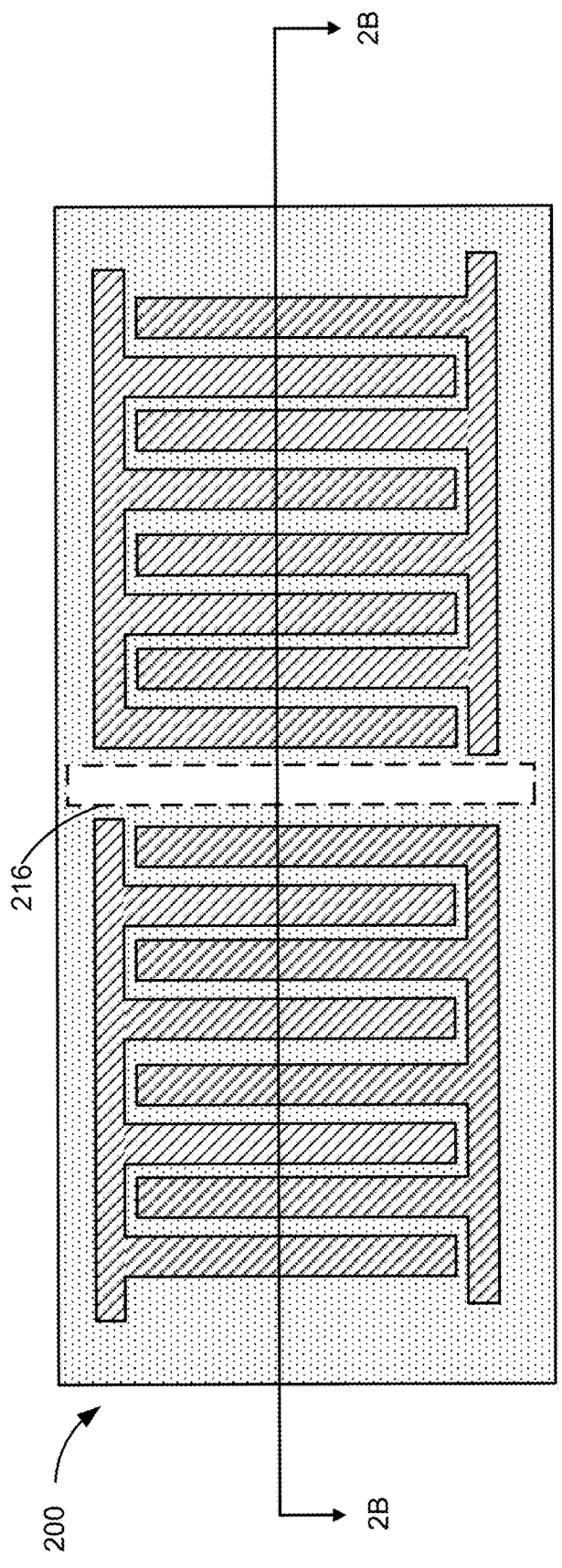
FIGS. 2A and 2B depict various views of a moisture sensor, according to aspects of the disclosure.
Figure 2B:
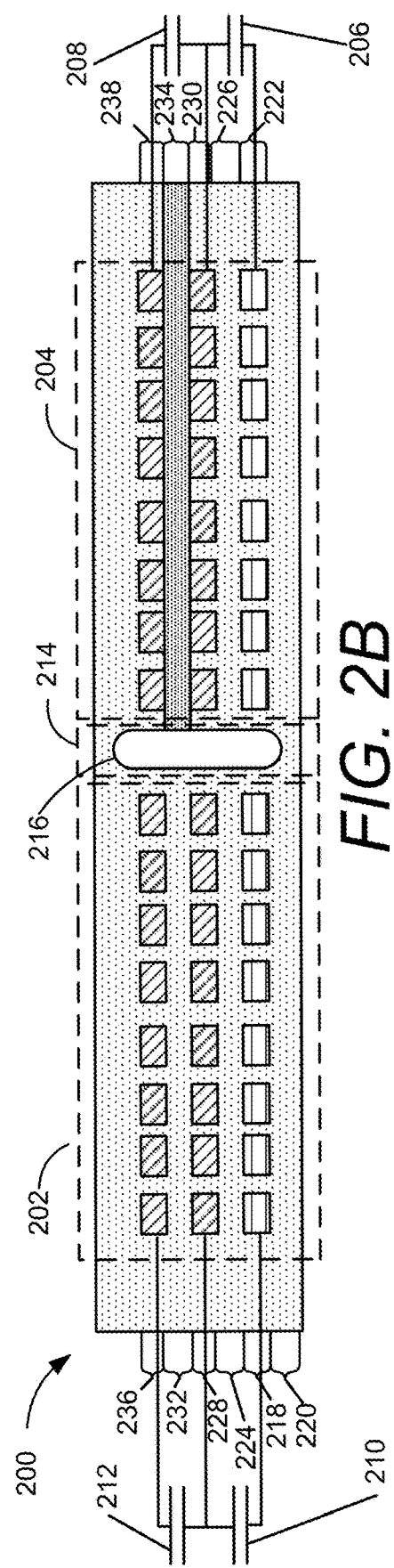

FIGS. 2A and 2B depict various views of an example moisture sensor 200, according to aspects of the disclosure. FIG. 2A is a top cutaway view of the moisture sensor 200 including an air gap 216. FIG. 2B is a cross-sectional view of the moisture sensor 200 taken along line 2B-2B of FIG. 2A.

In FIG. 2B, the moisture sensor 200 includes separate capacitor banks 202 and 204 that are arranged in a side-by-side architecture. Here, capacitor bank 204 includes a fixed-value capacitor 206 and a moisture-sensitive capacitor 208, while capacitor bank 202 includes a fixed-value capacitor 210 and a fixed-value capacitor 212. The capacitor banks 202 and 204 are formed as an integrated structure with a dielectric material in region 214 that is configured to isolate the capacitor banks 202 and 204 from one another. In an aspect, the capacitor banks 202 and 204 may be further isolated from one another by forming the air gap 216 in the dielectric material of region 214. The capacitor bank 204 may be formed in the same or similar manner as shown in the moisture sensor 100 of FIG. 1.

In an aspect, some of the structures of the capacitor bank 202 may be formed in the same processing operations used to form the corresponding structures of capacitance bank 204. As shown in FIG. 2B, the capacitor bank 202 includes a patterned refractory metal layer 218 disposed over a substrate 220. The patterned refractory metal layer 218 may be disposed coplanar with the patterned refractory metal layer 222. In an aspect, the patterned refractory metal layers 218 and 222 are formed from the same refractory metal.

The capacitor bank 202 includes a dielectric layer 224 formed from a moisture-insensitive dielectric material that is disposed over the patterned refractory metal layer 218. The dielectric layer 224 is coplanar with the dielectric layer 226 of the capacitance bank 204 and may be formed from the same material as the dielectric layer 226. A further patterned metal layer 228 is disposed over the dielectric layer 224 and is coplanar with the patterned metal layer 230 of the capacitor bank 204. The patterned refractory metal layer 218, the dielectric layer 224, and the patterned metal layer 228 form fixed-value capacitor 210.

The capacitor bank 202 also includes a dielectric layer 232 formed from a moisture-sensitive dielectric material that disposed over the patterned metal layer 228 and is coplanar with the dielectric layer 234 of capacitor bank 204. The material used to form dielectric layer 232 may be the same dielectric material used to form dielectric layer 224. A still further patterned metal layer 236 is disposed over the dielectric layer 232 and is coplanar with the patterned metal layer 238 of the capacitor bank 204. In this example, the patterned metal layer 236, the dielectric layer 232, and the patterned metal layer 228 form the capacitor 212, which shares the patterned metal layer 228 with the capacitor 210.

In an aspect, the patterned refractory metal layers and patterned metal layers may all have substantially the same patterns so that the traces forming the respective capacitors are aligned and have the same height and width. By using substantially the same patterns, any detectable difference between the capacitances of the capacitors 206, 208, 210, and 212 will be principally based on the moisture content of the moisture-sensitive dielectric layer 234. In certain scenarios, the capacitors 206, 210, and 212 are fixed value capacitors that may serve as reference capacitors with respect to the variable capacitance of the moisture-sensitive capacitor 208.

Figure 3:
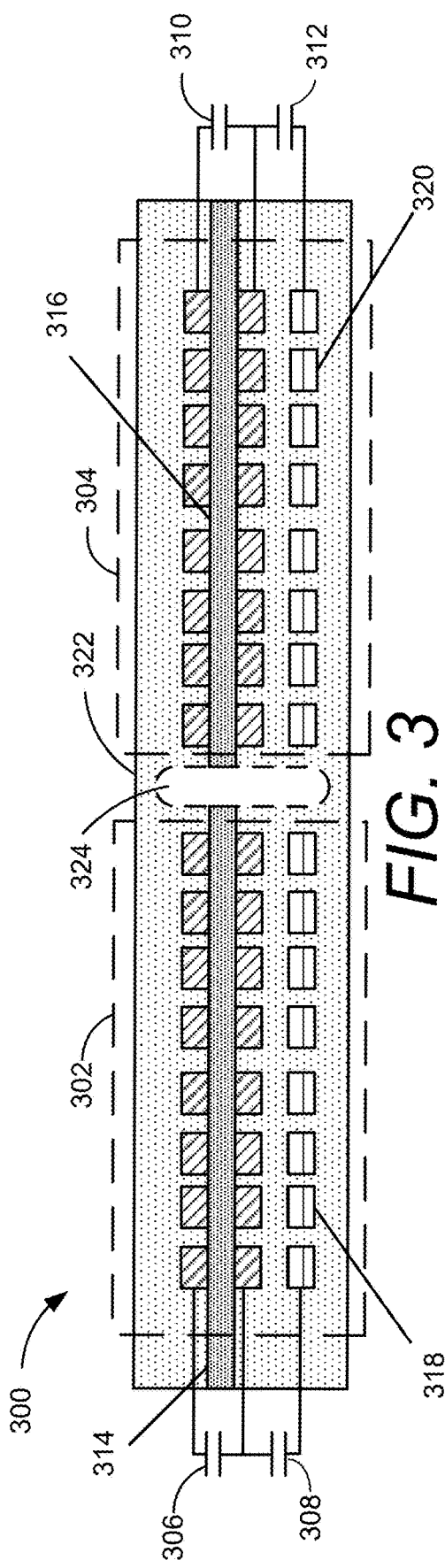
FIG. 3 through FIG. 8 depict various examples of moisture sensors, according to aspects of the disclosure.

FIG. 3 depicts an example moisture sensor 300, according to aspects of the disclosure. The construction of the moisture sensor 300 is similar to the construction of the moisture sensor 200 shown in FIGS. 2A and 2B. As shown, the moisture sensor 300 includes a pair of side-by-side capacitor banks 302 and 304 that are separated from one another by an isolating dielectric material 322 including an air gap 324. The capacitor bank 302 includes capacitors 306 and 308, while capacitor bank 304 includes capacitors 310 and 312. In this example, the dielectric layer 314 of the capacitor 306 is formed of a moisture-sensitive dielectric material, thereby making the capacitor 306 a moisture-sensitive capacitor. Similarly, the dielectric layer 316 of capacitor 310 is formed from a moisture-sensitive dielectric material, thereby making the capacitor 310 a moisture-sensitive capacitor. In contrast, capacitors 308 and 312 may be fixed-value capacitors.

The capacitor 308 includes a patterned refractory metal layer 318 that may serve as both a plate of the capacitor 308 as well as a heating element to remove moisture from the dielectric layer 314. Similarly, the capacitor 312 includes a patterned refractory metal layer 320 that may serve as both a plate of the capacitor 312 and a heating element that may be used to remove moisture from dielectric layer 316. Moisture sensors having multiple moisture-sensitive capacitors may be used in scenarios in which a measurement of relative humidity is desired.

Figure 4:
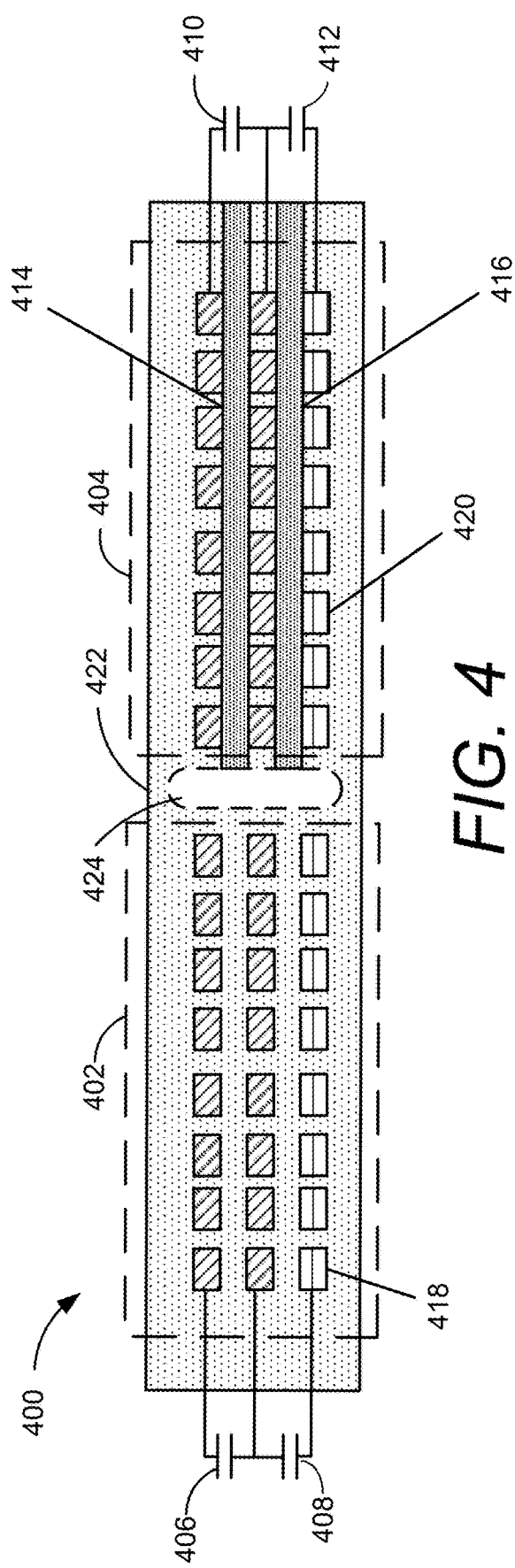

FIG. 4 depicts an example moisture sensor 400, according to aspects of the disclosure. The construction of the moisture sensor 400 is likewise similar to the construction of the moisture sensor 200 shown in FIGS. 2A and 2B. The moisture sensor 400 includes a pair of side-by-side capacitor banks 402 and 404 that are separated by an isolating dielectric material 422 including an air gap 424. The capacitor bank 402 includes the capacitors 406 and 408 while capacitor bank 404 includes the capacitors 410 and 412. In this example, the dielectric layer 414 of the capacitor 410 is formed of a moisture-sensitive dielectric material thereby making the capacitor 410 a moisture-sensitive capacitor. Similarly, the dielectric layer 416 of capacitor 412 is formed from a moisture-sensitive dielectric material, thereby making the capacitor 412 a moisture-sensitive capacitor. In contrast, capacitors 406 and 408 may be fixed-value capacitors. A moisture sensor having multiple moisture-sensitive capacitors may be used in scenarios in which a measurement of relative humidity is desired.

The capacitor 408 includes a patterned refractory metal layer 418 that may serve as both a plate of the capacitor 408 as well as a heating element that may be used, for example, to control the temperature of the moisture sensor 400. Similarly, the capacitor 412 includes a patterned refractory metal layer 418 that may serve as both a plate of the capacitor 412 and a heating element that may be used to reduce the moisture in dielectric layers 414 and 416. As noted above, a moisture sensor having multiple moisture-sensitive capacitors may be used in scenarios in which a measurement of relative humidity is desired.

Figure 5:
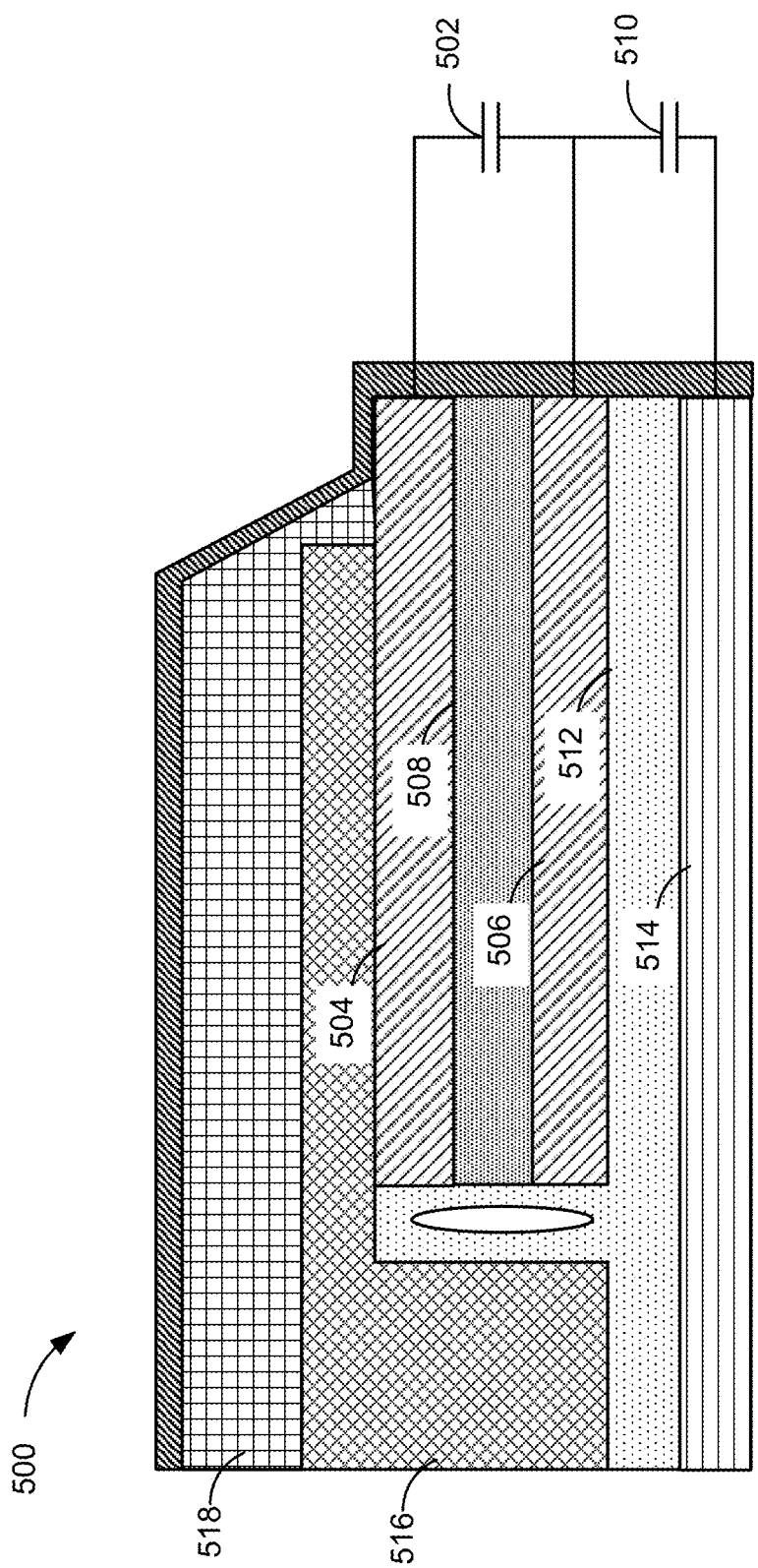

FIG. 5 depicts an example moisture sensor 500, according to aspects of the disclosure. In this example, the moisture sensor 500 includes a moisture-sensitive capacitor 502 formed by patterned metal layers 504 and 506 and a moisture-sensitive dielectric layer 508. The moisture sensor 500 further includes a fixed value capacitor 510 formed by the patterned metal layer 506, a dielectric layer 512 formed from a moisture-insensitive dielectric material, and a patterned refractory metal layer 514. The patterned refractory metal layer 514 may serve as both a plate of the capacitor 510 and a heating element that may be used to reduce the moisture in dielectric layer 512.

In accordance with various aspects of the disclosure, the moisture sensor 500 may include additional layers that overlie the structures forming the capacitors 502 and 510. In FIG. 5, the additional layers of the moisture sensor 500 include a layer 516 of fluorosilicate glass (FSG) or silicon nitride disposed over portions of the dielectric layer 512 and the patterned metal layer 504. A polyimide layer 518 may be disposed over the layer 516 and portions of the patterned metal layer 504 exposed by the layer 516. A polymer coating 520 that allows moisture to pass to the dielectric layer 508 may be disposed about the exterior of the moisture sensor 500.

Figure 6:
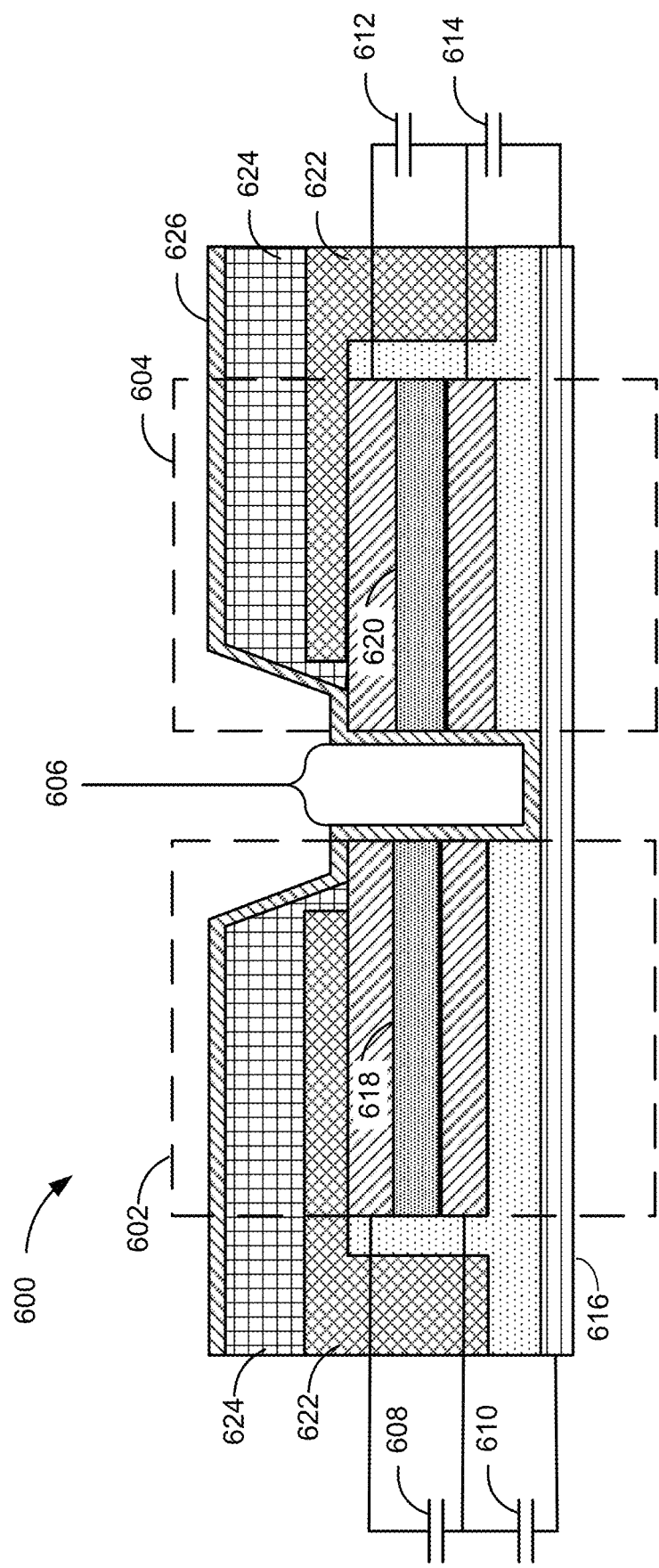

FIG. 6 depicts an example moisture sensor 600, according to aspects of the disclosure. In this example, the moisture sensor 600 includes side-by-side capacitor banks 602, 604 that are isolated from one another by an air gap 606. The capacitor bank 602 includes a moisture-sensitive capacitor 608 and a fixed-value capacitor 610. The capacitor bank 604 includes a moisture-sensitive capacitor 612 and a fixed-value capacitor 614. In an aspect, the fixed value capacitors 610, 614 may share a common refractory metal layer 616 which may function as plates of each capacitor 610, 614 as well as serving as a heating element to reduce the moisture in the moisture-sensitive dielectric layers 618, 620 of the moisture-sensitive capacitors 608, 612. In certain scenarios, the refractory metal layer 616 may be patterned so as to form separate plates for the fixed value capacitors 610, 614 as well as separate heating elements that, in certain aspects, may be operated independent of one another.

In accordance with various aspects of the disclosure, the moisture sensor 600 may include additional layers that overlie the structures forming the capacitors 608 and 612. In FIG. 6, the additional layers of the moisture sensor 600 may include a layer 622 of fluorosilicate glass (FSG) or silicon nitride and a polyimide layer 624 disposed over the layer 622. A polymer coating 626 that allows moisture to pass to the dielectric layers 618 and 620 may be disposed about the exterior of the moisture sensor 600.

Figure 7:
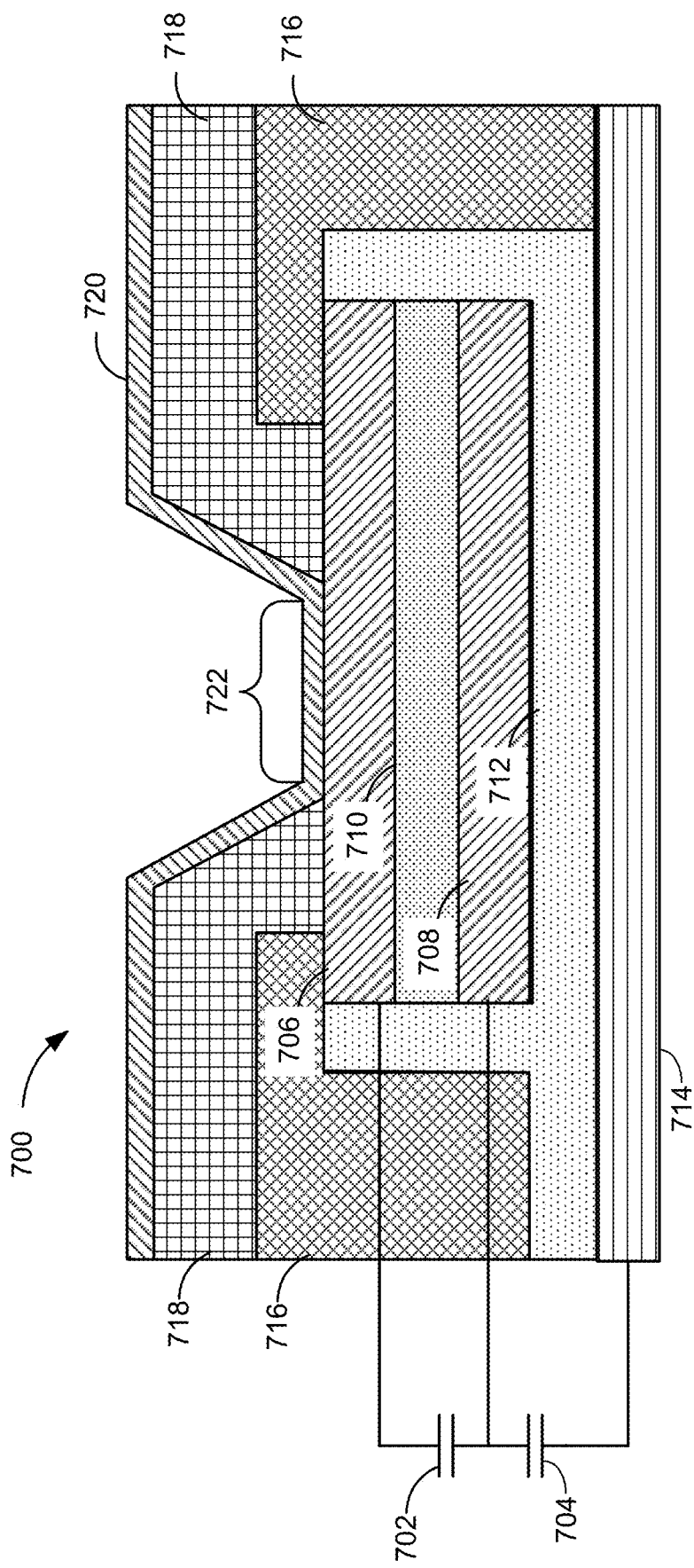

FIG. 7 depicts an example moisture sensor 700, according to aspects of the disclosure. In this example, the moisture sensor 700 includes a moisture-sensitive capacitor 702 and a fixed-value capacitor 704. The moisture-sensitive capacitor 702 is formed from patterned metal layers 706, 708 disposed at opposite sides of a moisture-sensitive dielectric layer 710. The fixed value capacitor 704 is formed from the patterned metal layer 708, dielectric layer 712 formed from a moisture-insensitive dielectric material, and a refractory metal layer 714. In an aspect, the refractory metal layer 714 may be patterned with a pattern that matches the pattern of the patterned metal layer 708.

In accordance with various aspects of the disclosure, the moisture sensor 700 may include additional layers that overlie the structures forming the capacitor 702. In FIG. 7 the additional layers of the moisture sensor 700 may include a layer 716 of fluorosilicate glass (FSG) or silicon nitride and a polyimide layer 718 disposed over the layer 716. A polymer coating 720 that allows moisture to pass to the dielectric layer 710 through a window region 722 may be disposed about the exterior of the moisture sensor 700.

Figure 8:
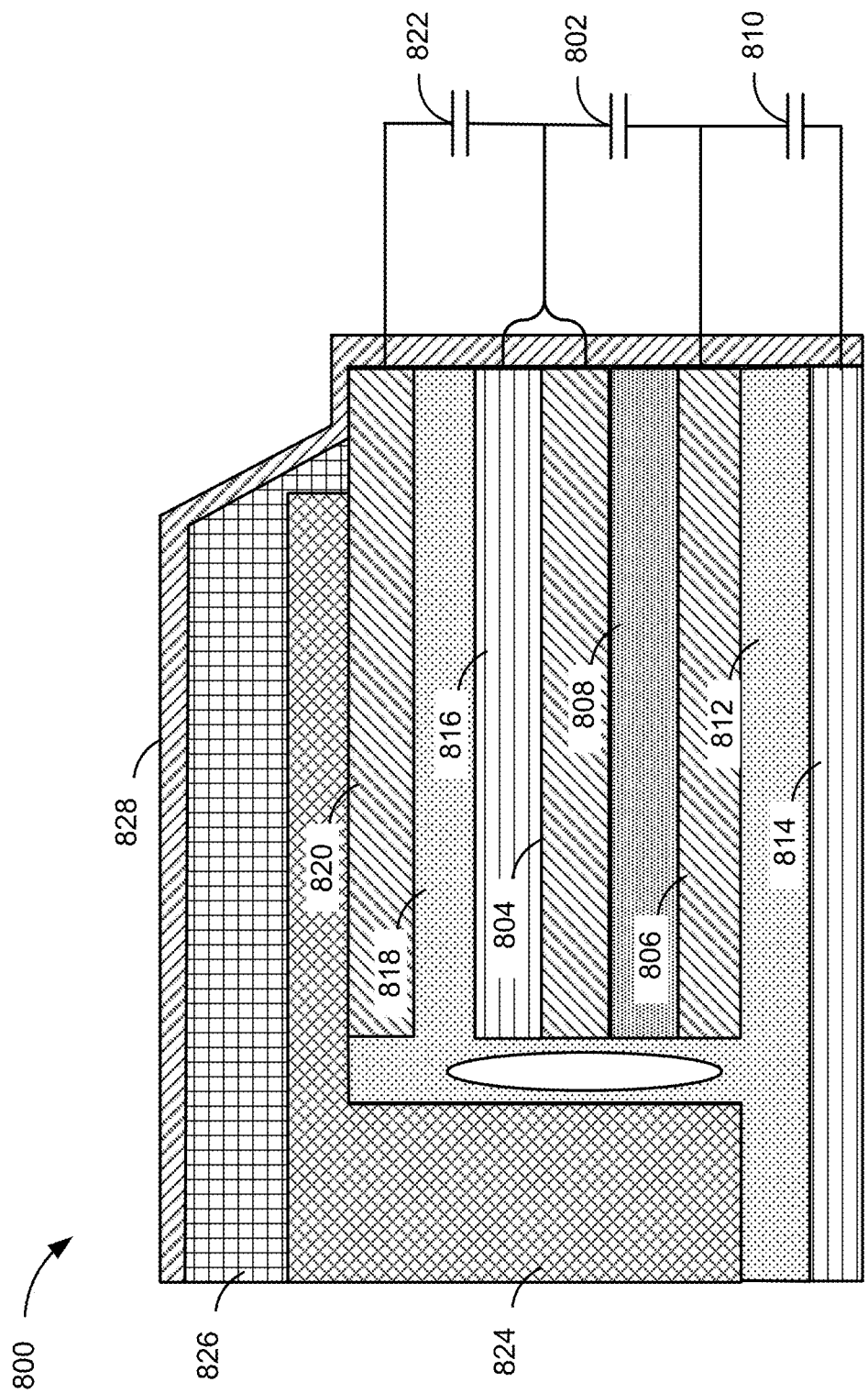

FIG. 8 depicts an example moisture sensor 800, according to aspects of the disclosure. In this example, the moisture sensor 800 includes a moisture-sensitive capacitor 802 formed by patterned metal layers 804 and 806 and a moisture-sensitive dielectric layer 808. The moisture sensor 800 further includes a fixed value capacitor 810 formed by the patterned metal layer 806, a dielectric layer 812 formed from a moisture-insensitive dielectric material, and a patterned refractory metal layer 814. The patterned refractory metal layer 814 may serve as both a plate of the capacitor 810 and a heating element that may be used to reduce the moisture in dielectric layer 812.

In an aspect, the example moisture sensor 800 may include additional heating elements to reduce the moisture in dielectric layer 812. In an aspect, the patterned metal layer 804 may be formed from a refractory metal and connected as the additional heating element to electrical power. In the example shown in FIG. 8, the additional heating element includes a patterned refractory metal layer 816 disposed over the patterned metal layer 804. The patterned metal layer 804 may be formed from the same refractory metal as refractory metal layer 816 or may be formed from a different metal. In FIG. 8, a dielectric layer 818 is disposed over the patterned refractory metal layer 816, and another patterned metal layer 820 is disposed over the dielectric layer 818. Together, the patterned refractory metal layer 816, dielectric layer, 818, and patterned metal layer 820 may form a further capacitor 822. An aspect, further capacitor 822 may be coupled in a frequency-sensitive circuit, such as one or more of the frequency-sensitive circuits described herein.

Figure 9:
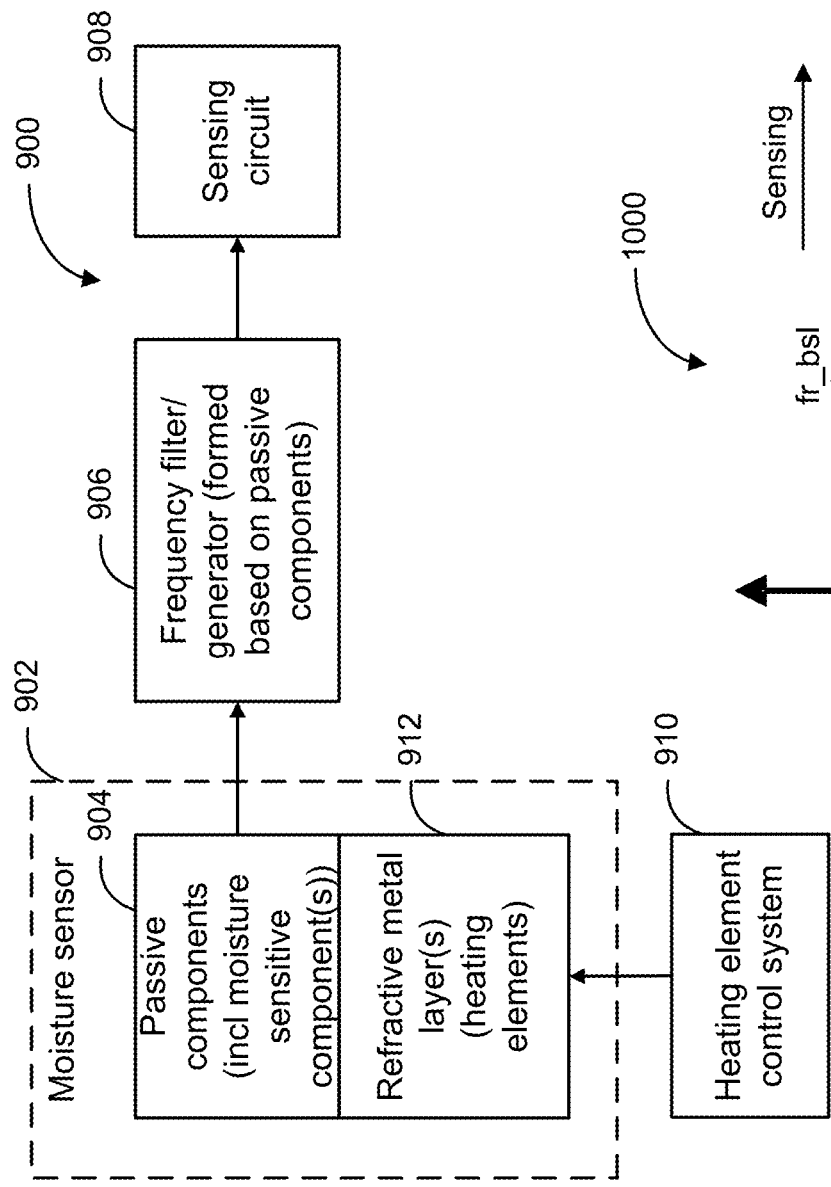
FIG. 9 shows an example of an electronic system that may be coupled to a moisture sensor, according to aspects of the disclosure.

In accordance with various aspects of the disclosure, the moisture sensor 800 may include additional layers that overlie the structures forming the capacitor 802, 810, and 810. In FIG. 8, the additional layers of the moisture sensor 800 include a layer 824 of fluorosilicate glass (FSG) or silicon nitride disposed over portions of the dielectric layer 812 and the patterned metal layer 820. A polyimide layer 826 may be disposed over the layer 824 and portions of the patterned metal layer 820 exposed by the layer 824. A polymer coating 828 that allows moisture to pass to the dielectric layer 808 may be disposed about the exterior of the moisture sensor 800. But FIG. 9 shows an example of an electronic system 900 that may be coupled to a moisture sensor 902, according to aspects of the disclosure. In an aspect, the electronic system 900 is a frequency-sensitive electronic circuit that is responsive to changes in capacitance resulting from exposure of the moisture-sensitive dielectric layer(s) included in the moisture sensor 902 to moisture. In this example, the passive components 904 (e.g., moisture sensor component(s), such as moisture-sensitive capacitors, and reference components, such as a fixed value reference capacitors) may be used with other electronic components to make a frequency filter and/or frequency generator 906. The frequency filter/generator 906 has a frequency response that is dependent on the value of the moisture-sensitive component(s) (e.g., moisture-sensitive capacitor(s)). In an aspect, the frequency response corresponds to the amount of moisture absorbed by the moisture-sensitive dielectric material of the moisture-sensitive component(s), which may be correlated with the humidity (e.g. ambient humidity, relative humidity, etc.). The frequency response of the frequency filter/generator 906 may be detected by a sensing circuit 908, which may provide an output signal indicative of the measured humidity.

The electronic system 900 may also include a heating element control system 910 that is connected to the refractive metal layer(s) 912 used to form at least some of the passive components 904 of the moisture sensor 902. When activated, the heating element control system 910 provides electrical power to the refractive metal layer(s) 912 to heat any moisture-sensitive dielectric layer(s) that are proximate the refractive metal layer(s) 912.

Figure 10:
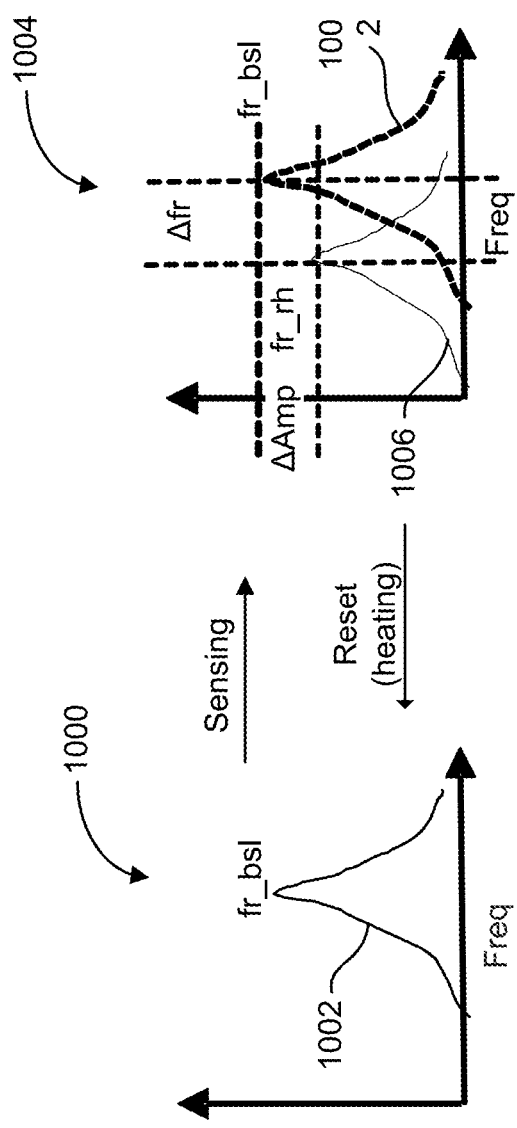
FIG. 10 illustrates a humidity detection cycle that may be performed by an electronic system, according to aspects of the disclosure.

FIG. 10 illustrates a humidity detection cycle that may be performed by the electronic system 900, according to aspects of the disclosure. In this example, the moisture in the moisture-sensitive dielectric materials of the moisture sensor 902 is driven to a baseline level. Graph 1000 shows an example of a baseline frequency response curve 1002 of the frequency filter/generator 906. In an aspect, the moisture in the moisture-sensitive dielectric materials may be driven to the baseline level by heating the moisture-sensitive dielectric materials through the application of electrical power to the refractive metal layer(s) 912 by the heating element control system 910.

During a sensing cycle, moisture (e.g., from the ambient environment) is allowed to penetrate the moisture-sensitive dielectric materials of the moisture sensor 902. The increase in the moisture of the moisture-sensitive dielectric material(s) causes a corresponding change in the dielectric constant value(s) of the moisture-sensitive dielectric materials used to form the passive moisture-sensitive components of the moisture sensor 902. Changes in the dielectric constant value result in a corresponding changes in the frequency response of the frequency filter/generator 906. Graph 1004 shows an example of a change in the frequency response of the frequency filter/generator 906, where response curve 1006 corresponds to the frequency response of the moisture sensor 902 during the sensing cycle. In this example, the frequency response curve 1006 has a peak that is shifted in frequency by a frequency differential $\Delta fr$ from the peak of the baseline frequency response curve 1002. In certain scenarios, the frequency response curve 1006 may also experience an amplitude shift $\Delta Amp$ from the peak amplitude of the baseline frequency response curve 1002. Once the humidity has been measured by the electronic system 900, the heating element control system 910 may provide power to the refractive metal layer(s) to heat the moisture-sensitive dielectric layer(s) of the moisture sensor 902 and drive the frequency of response of the frequency filter/generator 906 to the baseline response indicated by baseline frequency response curve 1002.

Figure 11:
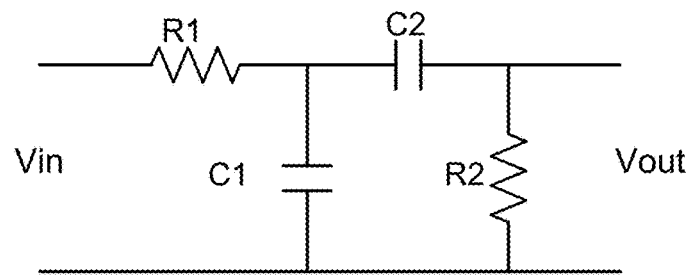
FIG. 11 is a schematic of an example filter circuit that may be incorporated in a frequency filter/generator, according to aspects of the disclosure.

FIG. 11 is a schematic of an example filter circuit 1100 that may be incorporated in a frequency filter/generator 906, according to aspects of the disclosure. The filter circuit 1100 may be implemented with the capacitors C1, C2 of a single capacitor bank of the moisture sensor 902. In this example, a pair of resistors R1 and R2 are configured with the capacitors C1, C2 to form the filter circuit 1100. In an aspect, either one or both capacitors C1, C2 may be moisture-sensitive capacitors. As such, the frequency response of the filter Vout/Vin is dependent on the moisture content of the moisture-sensitive dielectric layer(s) of the moisture-sensitive capacitors of the moisture sensor 902.

Figure 12:
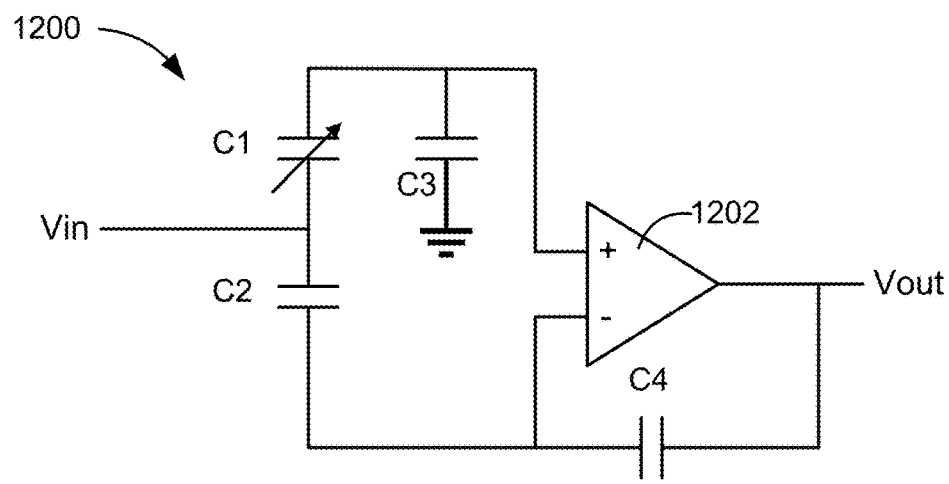
FIG. 12 is a schematic diagram of an example active filter circuit that may be used to implement a frequency filter/generator, according to aspects of the disclosure.

FIG. 12 is a schematic of an example active filter circuit 1200 that may be used to implement the frequency filter/generator 906, according to aspects of the disclosure. The active filter circuit 1200 includes an operational amplifier 1202 that is coupled to the capacitors C1, C2, C3, and C4 of a multiple capacitor bank moisture sensor. In this example, capacitor C1 is a moisture-sensitive capacitor and is depicted as a variable capacitor. In contrast, capacitors C2, C3, and C4 are the fixed-value capacitors of the multiple capacitor banks. However, it will be recognized, based on the teachings of the disclosure, that capacitors C1, C2, C3, and C3 of the active filter circuit 1200 may include any combination of moisture-sensitive capacitors and fixed value reference capacitors and still have a frequency response Vout/Vin that varies with the moisture content of the moisture-sensitive dielectric layers of the moisture-sensitive capacitors.

Figure 13:
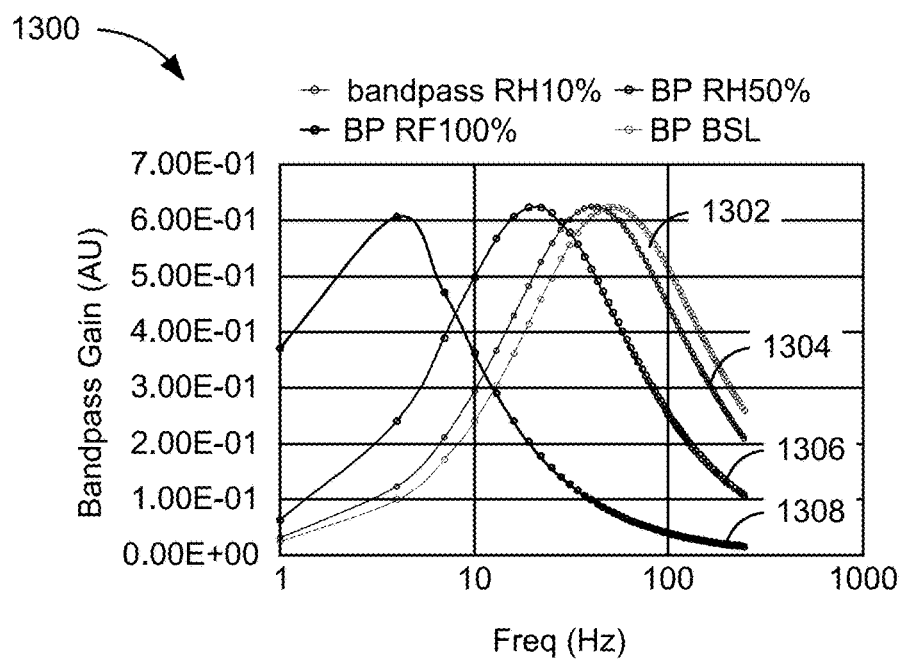
FIG. 13 is a graph of example frequency response curves for an active filter circuit under various humidity conditions, according to aspects of the disclosure.

FIG. 13 is a graph 1300 of example frequency response curves of an active filter circuit (e.g., active filter circuit 1200) under various humidity conditions, according to aspects of the disclosure. In this example, the frequency response curve 1302 represents the baseline frequency response. The frequency response curve 1304 represents an example frequency response of the active filter circuit when the relative humidity is 10%. The frequency response curve 1306 represents an example frequency response of the active filter when the relative humidity is 50%. The frequency response curve 1308 represents an example frequency response of the active filter when the relative humidity is 100%. It will be recognized, based on the teachings of the disclosure, that various active filter configurations will provide different frequency response curves under different humidity conditions.

Figure 14:
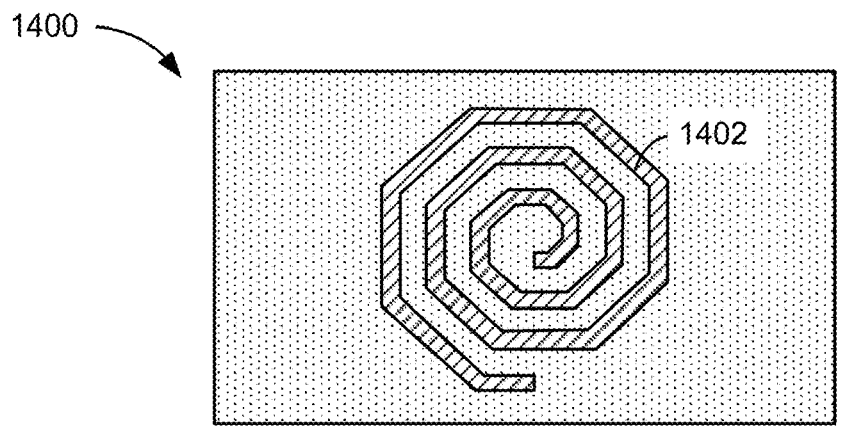
FIG. 14 illustrates an example moisture sensor having a fixed value inductor, according to aspects of the disclosure.
Figure 15:
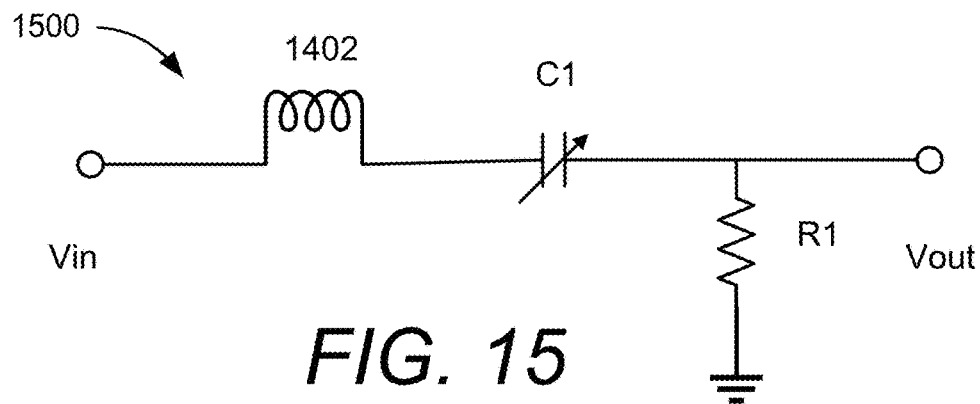
FIG. 15 is a schematic diagram of a passive filter circuit formed using a fixed value inductor and a moisture-sensitive capacitor of the moisture sensor, according to aspects of the disclosure.

According to certain aspects of the disclosure, the moisture sensor may be configured to implement a fixed-value inductor. FIG. 14 illustrates an example moisture sensor 1400 having a fixed value inductor, according to aspects of the disclosure. In this example, the fixed value inductor 1402 is implemented as a winding pattern of at least one of the patterned layers (e.g., patterned metal layers and/or patterned refractory metal layer) of the moisture sensor. FIG. 15 is a schematic diagram of a passive filter circuit 1500 formed using a fixed value inductor 1402 and moisture-sensitive capacitor C1 of the moisture sensor 1400, according to aspects of the disclosure.

Figure 16:
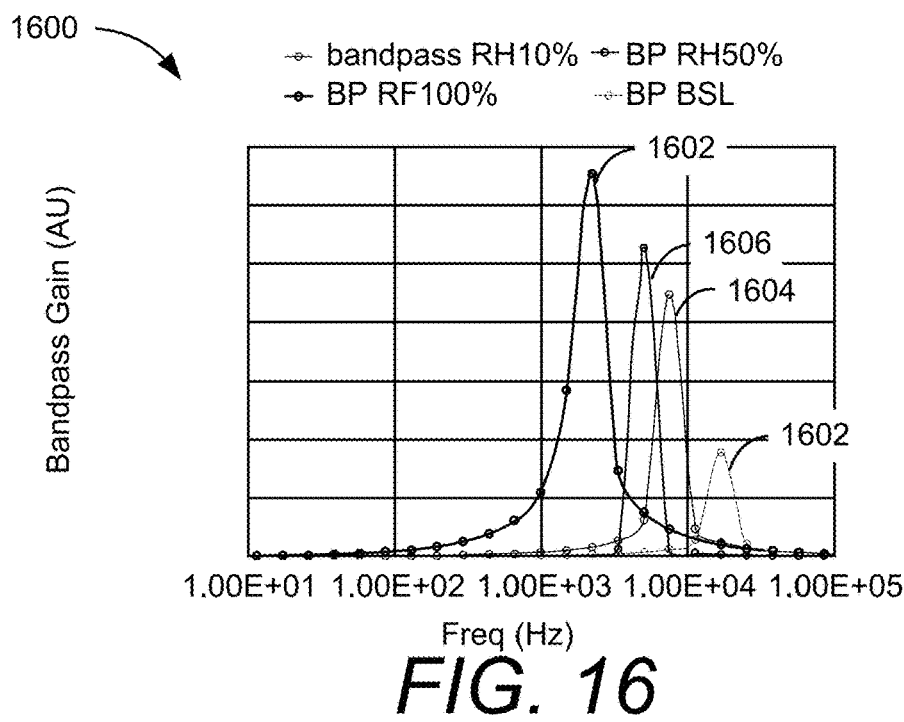
FIG. 16 is a graph of example frequency response curves for a passive filter circuit having a fixed value inductor under various humidity conditions, according to aspects of the disclosure.

FIG. 16 is a graph 1600 of example frequency response curves for a passive filter circuit including a fixed value inductor (e.g., passive filter circuit 1500) under various humidity conditions, according to aspects of the disclosure. In this example, the frequency response curve 1602 represents the baseline frequency response. The frequency response curve 1604 represents an example frequency response of the passive filter circuit 1500 when the relative humidity is 10%. The frequency response curve 1606 represents an example frequency response of the passive filter circuit 1500 when the relative humidity is 50%. The frequency response curve 1608 represents an example frequency response of the passive filter circuit 1500 when the relative humidity is 100%. It will be recognized, based on the teachings of the disclosure, that various filter configurations incorporating the fixed inductor and moisture-sensitive capacitor will provide different frequency response curves under different humidity conditions.

Figure 17:
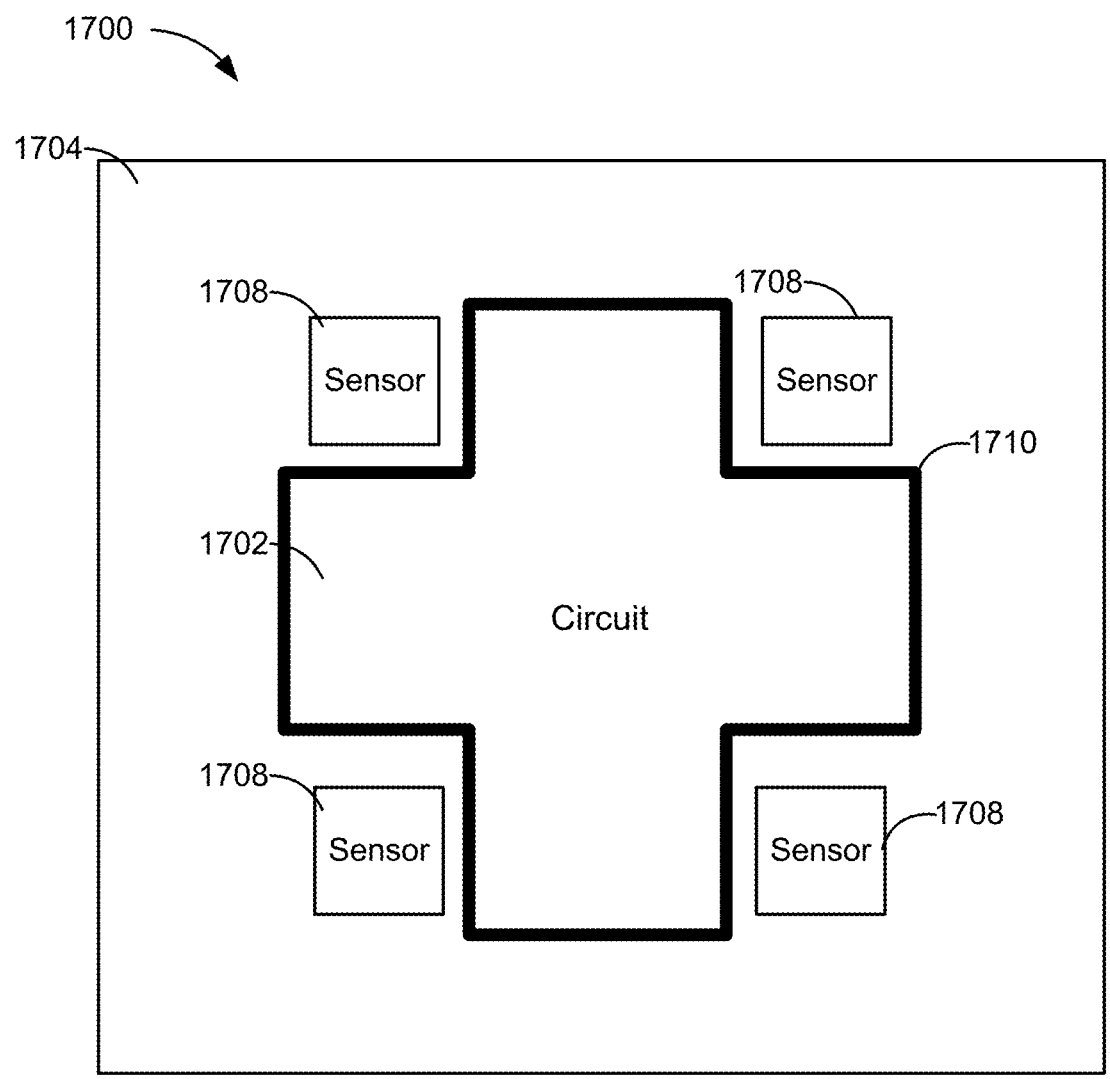
FIG. 17 illustrates an example packaging scenario for an electronic circuit that includes a plurality of moisture sensors, according to aspects of the disclosure.

The disclosed moisture sensors may be used in different packaging scenarios. FIG. 17 illustrates an example packaging scenario 1700 for an electronic circuit that includes a plurality of moisture sensors, according to aspects of the disclosure. In the packaging scenario 1700, an electronic circuit 1702 is mounted on or formed in a substrate 1704. The electronic circuit 1702 is bounded on all sides by a moisture barrier 1710. A plurality of moisture sensors 1708, having any of the disclosed moisture sensor configurations shown in FIGS. 1 through 7, are mounted on or formed in the same substrate 1704 as electronic circuit 1702 in regions of the substrate 1704 exterior to the moisture barrier 1710. In accordance with certain aspects of the disclosure, the electronic circuit 1702 may include components (e.g., frequency filter/generator components, sensing circuit components, heating element control system components, etc.) that are connected to facilitate the functioning of the moisture sensors 1708 in their role as humidity detectors.

Figure 18:
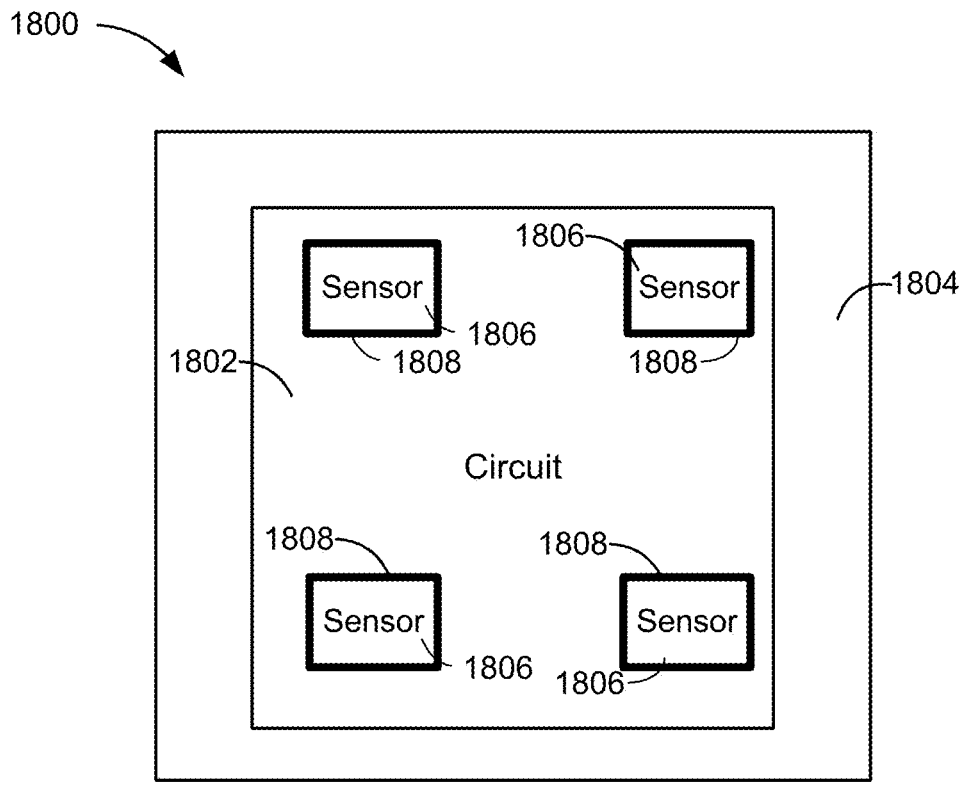
FIG. 18 illustrates an example packaging scenario for an electronic circuit that includes a plurality of moisture sensors, according to aspects of the disclosure.

FIG. 18 illustrates an example packaging scenario 1800 for an electronic circuit that includes a plurality of moisture sensors, according to aspects of the disclosure. In the packaging scenario 1800, an electronic circuit 1802 is mounted on or formed in a substrate 1804. A plurality of moisture sensors 1806, having any of the disclosed moisture sensor configurations shown in FIGS. 1 through 8, are mounted on or formed in the substrate 1804. Each of the moisture sensors 1806 are separated from the electronic circuit 1802 by respective moisture barriers 1808. In accordance with certain aspects of the disclosure, the electronic circuit 1802 may include components (e.g., frequency filter/generator components, sensing circuit components, heating element control system components, etc.) that are connected to facilitate the functioning of the moisture sensors 1806 in their role as humidity detectors.

Figure 19:
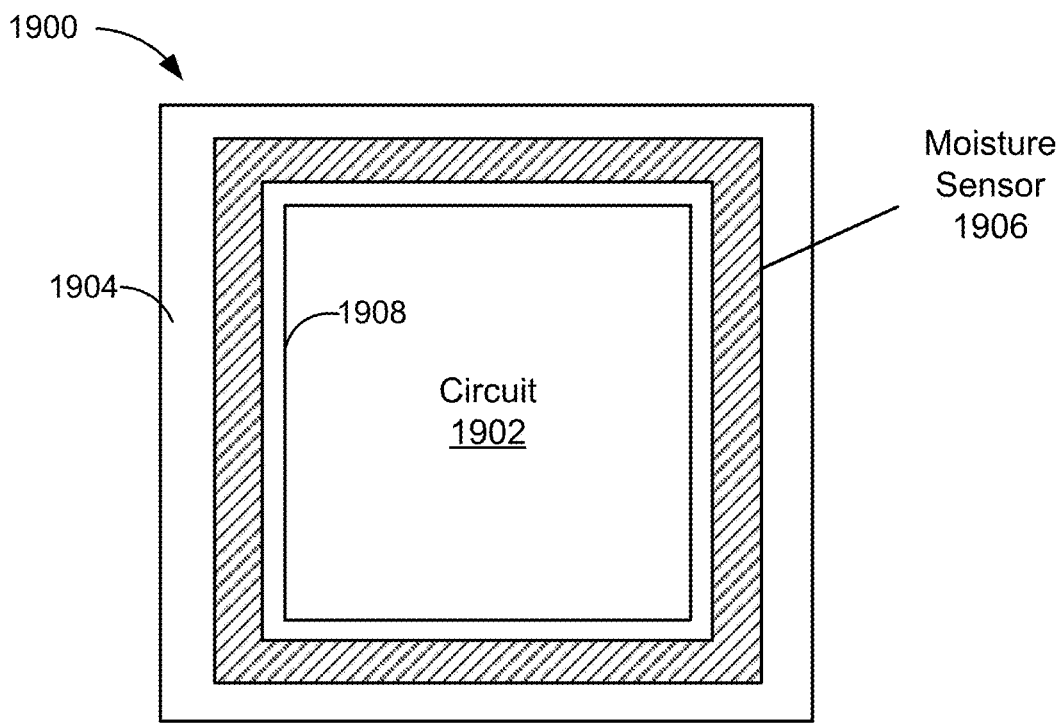
FIG. 19 illustrates an example packaging scenario for an electronic circuit includes a moisture sensor, according to aspects of the disclosure.

FIG. 19 illustrates an example packaging scenario 1900 for an electronic circuit that includes a moisture sensor, according to aspects of the disclosure. In the packaging scenario 1900, an electronic circuit 1902 is mounted on or formed in a substrate 1904. A moisture sensor 1906, having a moisture sensor configuration such as shown in FIG. 1, is mounted on or formed in the substrate 1904 about the periphery of the electronic circuit 1902. In an aspect, the moisture sensor 1906 may be isolated from the electronic circuit 1902 by a moisture barrier 1908. In accordance with certain aspects of the disclosure, the electronic circuit 1902 may include components (e.g., frequency filter/generator components, sensing circuit components, heating element control system components, etc.) that are connected to facilitate the functioning of the moisture sensor 1906 in its role as a humidity detector.

Figure 20:
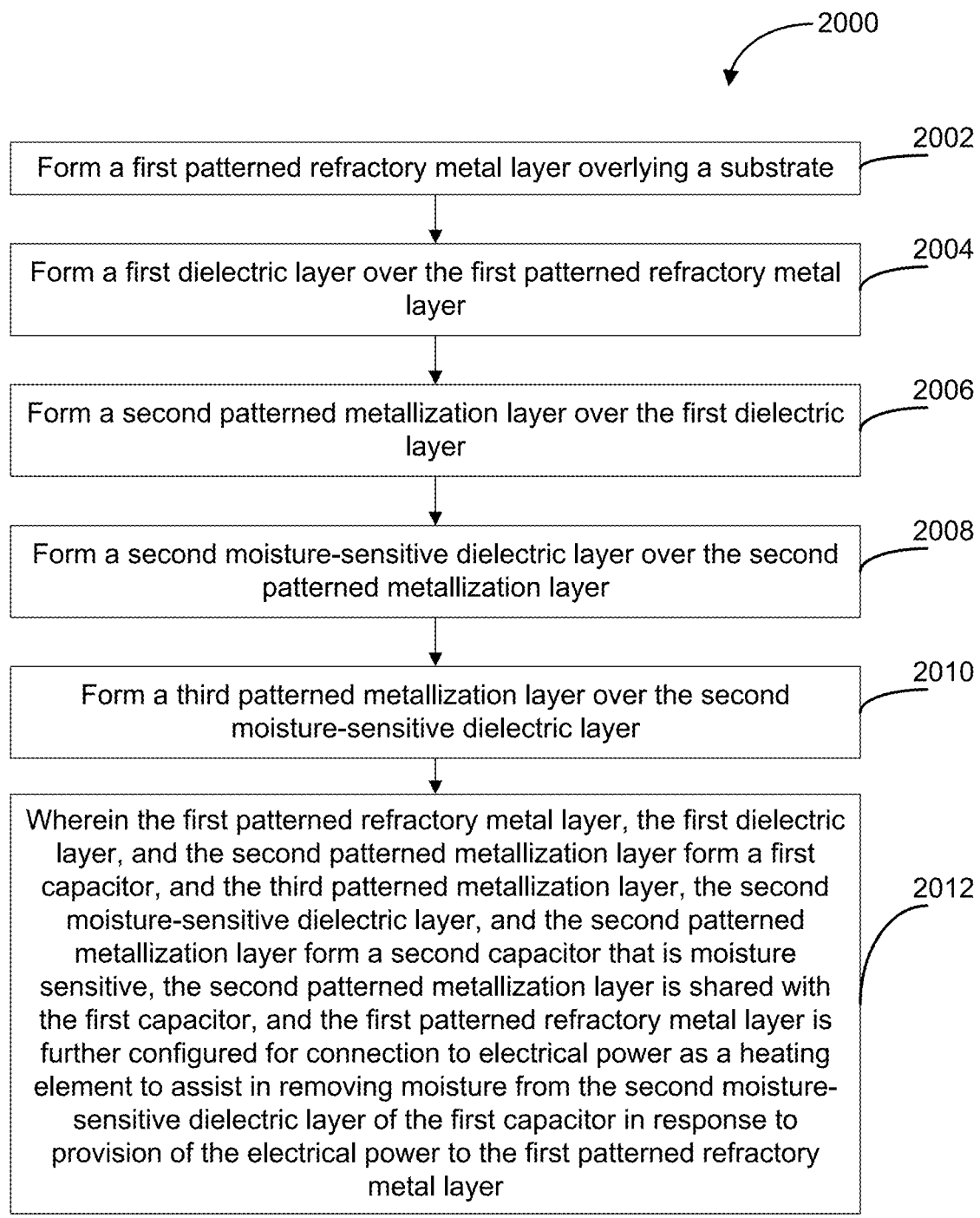
FIG. 20 shows an example method for fabricating a moisture sensor, according to aspects of the disclosure.

FIG. 20 shows an example method 2000 for fabricating a moisture sensor, according to aspects of the disclosure. At operation 2002, a first patterned refractory metal layer is formed that overlies a substrate. At operation 2004, a first dielectric layer is formed over the first patterned refractory metal layer. At operation 2006, a second patterned metal layer is formed over the first dielectric layer. At operation 2008, a second moisture-sensitive dielectric layer is formed over the second patterned metal layer. At operation 2010, a third patterned metal layer is formed over the second moisture-sensitive dielectric layer. Operation 2012 describes the components formed by the various layers formed in operations 2002 through 2010, where the first patterned refractory metal layer, the first dielectric layer, and the second patterned metal layer form a first capacitor, and the third patterned metal layer, the second moisture-sensitive dielectric layer, and the second patterned metal layer form a second capacitor that is moisture-sensitive in which the second patterned metal layer is shared with the first capacitor, and the first patterned refractory metal layer is further configured for connection to electrical power as a heating element to assist in removing moisture from the second moisture-sensitive dielectric layer of the first capacitor in response to provision of the electrical power to the first patterned refractory metal layer.

Figure 21:
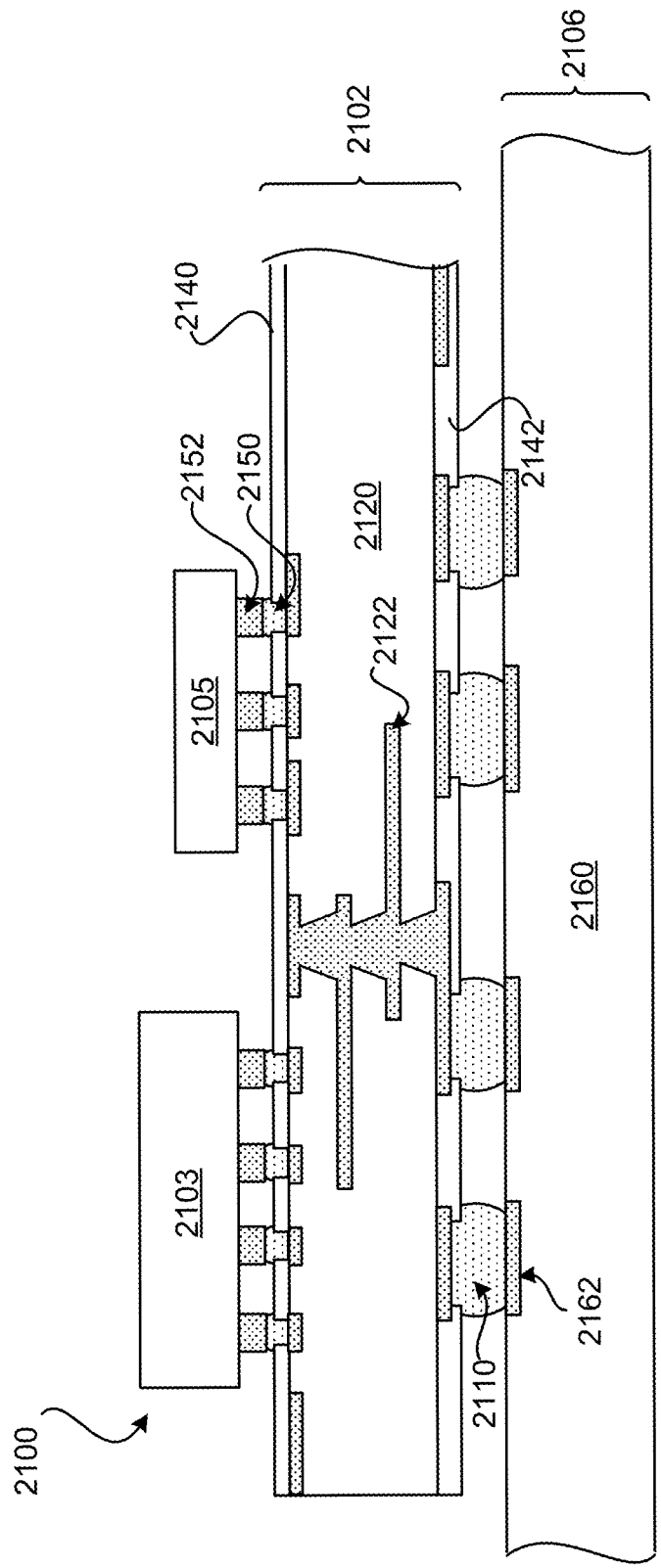
FIG. 21 illustrates a profile view of a package that includes a surface mount substrate, an integrated device and an integrated moisture sensor device, according to aspects of the disclosure.

FIG. 21 illustrates a profile view of a package 2100 that includes a surface mount substrate 2102, an integrated device 2103, and an integrated passive device 2105 (e.g., moisture sensor), according to aspects of the disclosure. The package 2100 may be coupled to a printed circuit board (PCB) 2106 through a plurality of solder interconnects 2110. The PCB 2106 may include at least one board dielectric layer 2160 and a plurality of board interconnects 2162.

The surface mount substrate 2102 includes at least one dielectric layer 2120 (e.g., substrate dielectric layer), a plurality of interconnects 2122 (e.g., substrate interconnects), a solder resist layer 2140 and a solder resist layer 2142. The integrated device 2103 may be coupled to the surface mount substrate 2102 through a plurality of solder interconnects 2130. The integrated device 2103 may be coupled to the surface mount substrate 2102 through a plurality of pillar interconnects 2132 and the plurality of solder interconnects 2130. The integrated passive device 2105 may be coupled to the surface mount substrate 2102 through a plurality of solder interconnects 2150. The integrated passive device 2105 may be coupled to the surface mount substrate 2102 through a plurality of pillar interconnects 2152 and the plurality of solder interconnects 2150.

The package (e.g., 2100) may be implemented in a radio frequency (RF) package. The RF package may be a radio frequency front end (RFFE) package. A package (e.g., 2100) may be configured to provide Wireless Fidelity (WiFi) communication and/or cellular communication (e.g., 2G, 3G, 4G, 5G). The package (e.g., 2100) may be configured to support Global System for Mobile (GSM) Communications, Universal Mobile Telecommunications System (UMTS), and/or Long-Term Evolution (LTE). The package (e.g., 2100) may be configured to transmit and receive signals having different frequencies and/or communication protocols.

Figure 22:
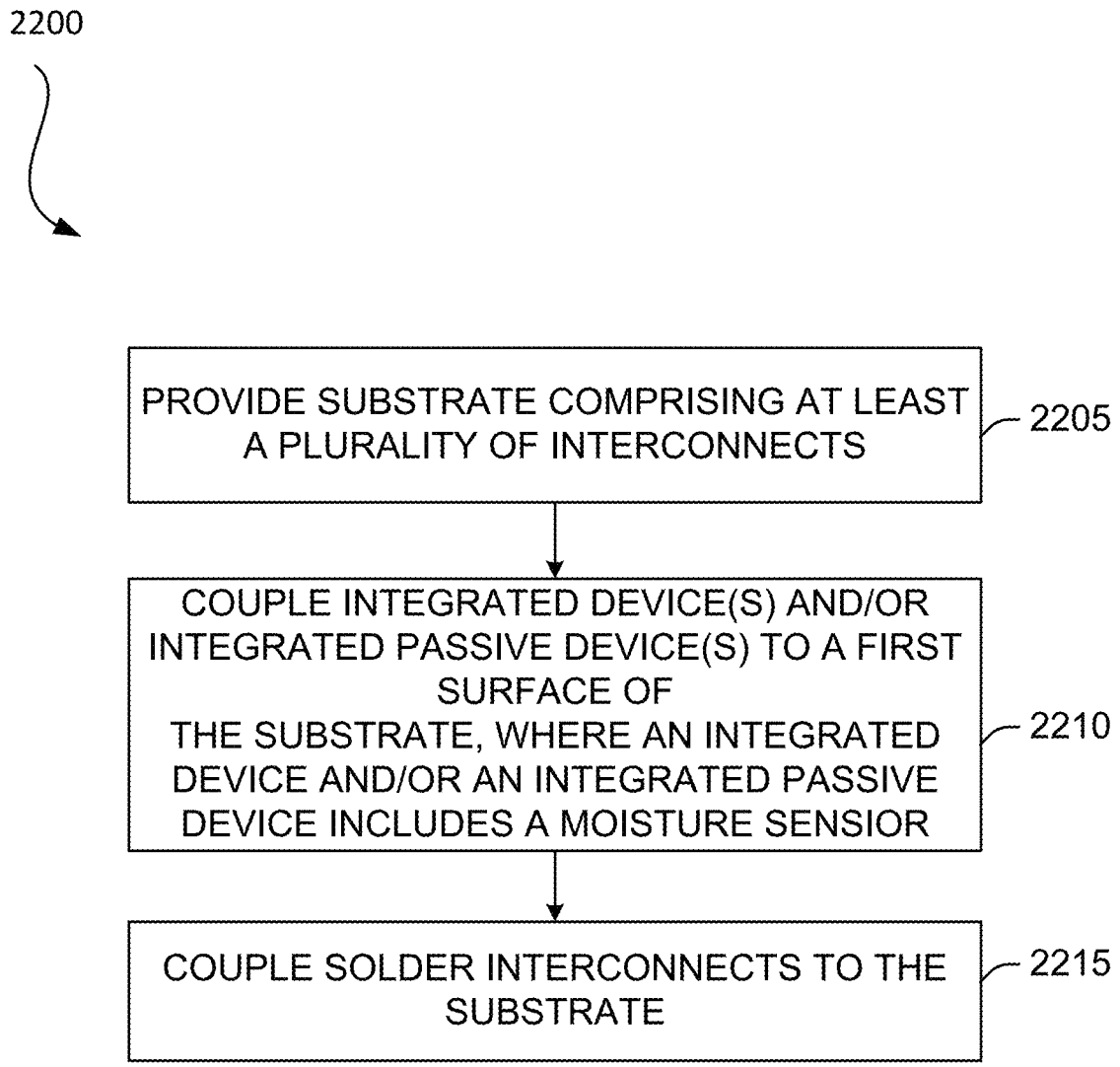
FIG. 22 illustrates an exemplary flow diagram of method for fabricating a package that includes a substrate, an integrated device and an integrated passive device.

FIG. 22 illustrates an example method 2200 for providing or fabricating a package that includes an integrated device comprising a moisture sensor, according to aspects of the disclosure. In some implementations, the method 2200 of FIG. 22 may be used to provide or fabricate the package 2100 of FIG. 21 described in the disclosure. However, the method 2200 may be used to provide or fabricate any of the packages described in the disclosure.

It should be noted that the method of FIG. 22 may combine one or more processes in order to simplify and/or clarify the method for providing or fabricating a package that includes an integrated device comprising a magnetic layer and/or an integrated passive device comprising a magnetic layer. In some implementations, the order of the processes may be changed or modified.

The method provides (at 2205) a substrate (e.g., 2102). The substrate 2102 may be provided by a supplier or fabricated. The substrate 2102 includes at least one dielectric layer 2120, and a plurality of interconnects 2122. The substrate 2102 may include an embedded trace substrate (ETS). In some implementations, the at least one dielectric layer 2120 may include prepreg layers.

The method couples (at 2210) at least one integrated device (e.g., 2103) to the first surface of the substrate (e.g., 2102). For example, the integrated device 2103 may be coupled to the substrate 2102 through the plurality of pillar interconnects 2132 and the plurality of solder interconnects 2130. The plurality of pillar interconnects 2132 may be optional. The plurality of solder interconnects 2130 are coupled to the plurality of interconnects 2122. A solder reflow process may be used to couple the integrated device 2103 to the plurality of interconnects through the plurality of solder interconnects 2130.

The method also couples (at 2210) at least one integrated passive device (e.g., 2105) to the first surface of the substrate (e.g., 2102). For example, the integrated passive device 2105 may be coupled to the substrate 2102 through the plurality of pillar interconnects 2152 and the plurality of solder interconnects 2150. The plurality of pillar interconnects 2152 may be optional. The plurality of solder interconnects 2150 are coupled to the plurality of interconnects 2122. A solder reflow process may be used to couple the integrated passive device 2105 to the plurality of interconnects through the plurality of solder interconnects 2150.

The method couples (at 2215) a plurality of solder interconnects (e.g., 2110) to the second surface of the substrate (e.g., 2102). A solder reflow process may be used to couple the plurality of solder interconnects 2110 to the substrate.

Figure 23:
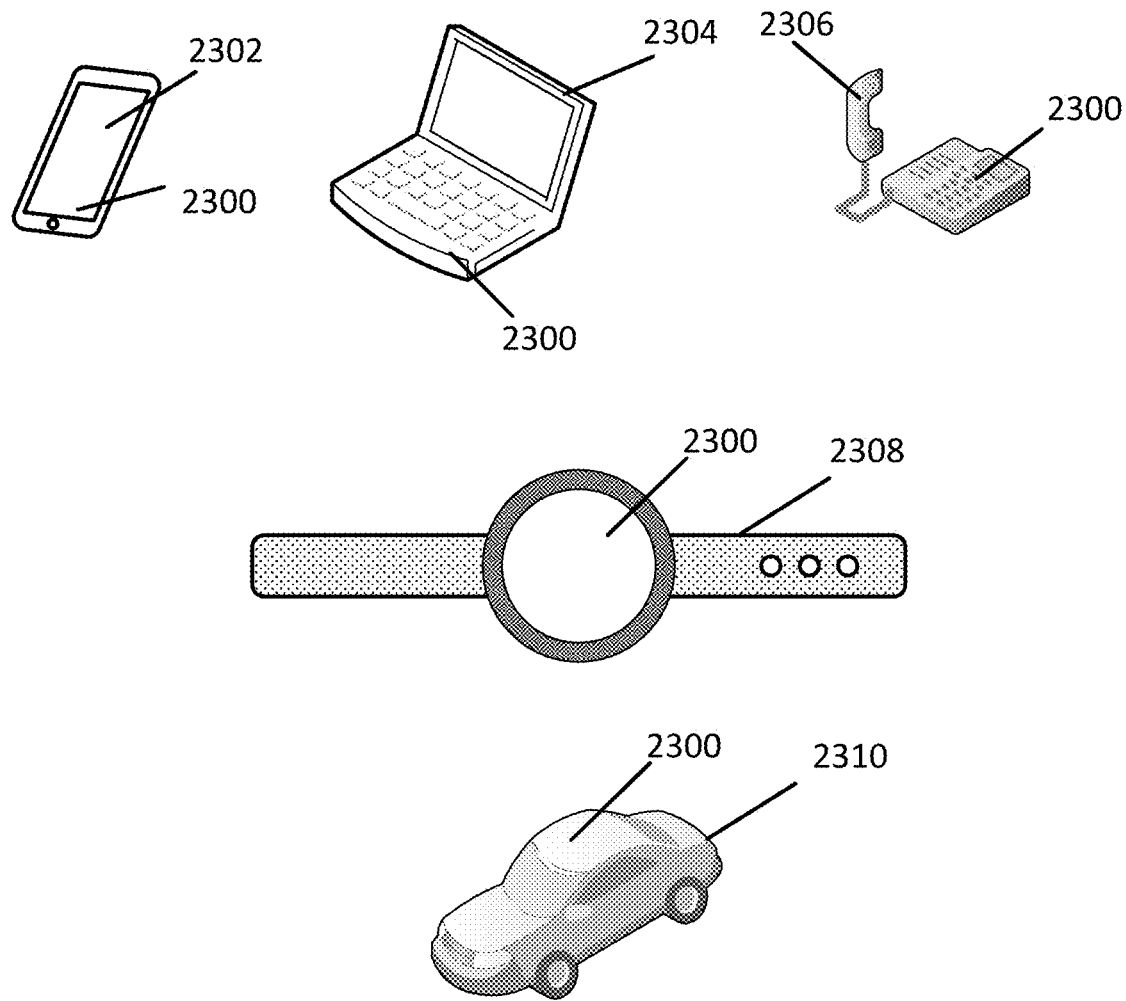
FIG. 23 illustrates various electronic devices that may integrate a die, an electronic circuit, an integrated device, an integrated passive device, a passive component, a package, and/or a device package described herein.

FIG. 23 illustrates various electronic devices that may be integrated with any of the aforementioned devices, integrated devices, integrated circuit (IC) packages, integrated circuit (IC) devices, semiconductor devices, integrated circuits, dies, interposer packages, package-on-package (POP), System in Package (SiP), or System on Chip (SoC). For example, a mobile phone device 2302, a laptop computer device 2304, a fixed location terminal device 2306, a wearable device 2308, or automotive vehicle 2310 may include a device 2300 as described herein. The device 2300 may be, for example, any of the devices and/or integrated circuit (IC) packages described herein. The devices 2302, 2304, 2306 and 2308 and the vehicle 2310 illustrated in FIG. 23 are merely exemplary. Other electronic devices may also feature the device 2300 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices (e.g., watches, glasses), Internet of things (IoT) devices, servers, routers, electronic devices implemented in automotive vehicles (e.g., autonomous vehicles), or any other device that stores or retrieves data or computer instructions, or any combination thereof.

Implementation examples are described in the following numbered aspects:

Aspect 1. A device comprising: a first patterned metal layer; a first dielectric layer disposed over the first patterned metal layer; a second patterned metal layer disposed over the first dielectric layer, wherein the first patterned metal layer, the first dielectric layer, and the second patterned metal layer form a first capacitor; a second moisture-sensitive dielectric layer disposed over the second patterned metal layer; and a third patterned metal layer disposed over the second moisture-sensitive dielectric layer, wherein the third patterned metal layer, the second moisture-sensitive dielectric layer, and the second patterned metal layer form a second capacitor, the second patterned metal layer is shared with the first capacitor, and the first patterned metal layer is further configured for connection to electrical power as a heating element to assist in removing moisture from the second moisture-sensitive dielectric layer of the second capacitor.

Aspect 2. The device of aspect 1, further comprising: a first frequency-sensitive circuit formed using at least the first capacitor and the second capacitor, wherein the first frequency-sensitive circuit has a first frequency response that changes based at least on a variable capacitance value of the second capacitor resulting from exposure of the second moisture-sensitive dielectric layer to moisture.

Aspect 3. The device of aspect 2, wherein: the first dielectric layer is formed from a moisture-insensitive dielectric material; and the first capacitor is configured as a first reference capacitor in the first frequency-sensitive circuit.

Aspect 4. The device of aspect 1, wherein: the first dielectric layer is formed as a moisture-sensitive dielectric layer to form the first capacitor as a moisture-sensitive capacitor.

Aspect 5. The device of aspect 4, further comprising: a second frequency-sensitive circuit formed using the first capacitor and the second capacitor, wherein the second frequency-sensitive circuit has a second frequency response that changes based at least on variable capacitance values of the first capacitor and the second capacitor resulting from exposure of the first dielectric layer and the second moisture-sensitive dielectric layer to moisture.

Aspect 6. The device of any of aspects 1 to 5, further comprising: a fourth patterned metal layer disposed coplanar with the first patterned metal layer, wherein the first patterned metal layer and the fourth patterned metal layer are formed from a same metal; a third dielectric layer disposed over the fourth patterned metal layer and coplanar with the first dielectric layer; a fifth patterned metal layer disposed over the third dielectric layer and coplanar with the second patterned metal layer, wherein the fourth patterned metal layer, the third dielectric layer, and the fifth patterned metal layer form a third capacitor; a fourth dielectric layer disposed over the fifth patterned metal layer and coplanar with the second moisture-sensitive dielectric layer; and a sixth patterned metal layer disposed over the fourth dielectric layer and coplanar with the third patterned metal layer, wherein the sixth patterned metal layer, the fourth dielectric layer, and the fifth patterned metal layer form a fourth capacitor in which the fifth patterned metal layer is shared with the third capacitor.

Aspect 7. The device of aspect 6, wherein: the first dielectric layer, the third dielectric layer, and the fourth dielectric layer are formed from a moisture-insensitive dielectric material.

Aspect 8. The device of any of aspects 6 to 7, further comprising: a third frequency-sensitive circuit formed using the first capacitor, the second capacitor, the third capacitor, and the fourth capacitor, wherein the third frequency-sensitive circuit has a third frequency response that changes based at least on a variable capacitance value of the second capacitor resulting from exposure of the second moisture-sensitive dielectric layer to moisture.

Aspect 9. The device of aspect 6, wherein: the fourth dielectric layer is formed from a same moisture-sensitive dielectric material as the second moisture-sensitive dielectric layer to form the fourth capacitor as a moisture-sensitive capacitor.

Aspect 10. The device of aspect 9, further comprising: a fourth frequency-sensitive circuit formed using the first capacitor, the second capacitor, the third capacitor, and the fourth capacitor, wherein the fourth frequency-sensitive circuit has a fourth frequency response that changes based at least on variable capacitance values of the second capacitor and the fourth capacitor resulting from exposure of the second moisture-sensitive dielectric layer and the fourth dielectric layer to moisture.

Aspect 11. The device of aspect 10, wherein: the first dielectric layer and the third dielectric layer are formed from a same moisture-insensitive dielectric material; and the first capacitor and the third capacitor are configured as reference capacitors in the fourth frequency-sensitive circuit.

Aspect 12. The device of any of aspects 6 to 11, wherein: the first capacitor and the second capacitor are separated from the third capacitor and the fourth capacitor by an isolating structure formed from a dielectric material, wherein the dielectric material includes an air gap therein to further isolate the first capacitor and the second capacitor from the third capacitor and the fourth capacitor.

Aspect 13. The device of any of aspects 1 to 12, wherein: the third patterned metal layer is further configured for connection to the electrical power as a further heating element to assist in removing moisture from the second moisture-sensitive dielectric layer of the second capacitor.

Aspect 14. The device of any of aspects 1 to 12, further comprising: a seventh patterned metal layer disposed over the third patterned metal layer, wherein the seventh patterned metal layer is further configured for connection to the electrical power as a further heating element.

Aspect 15. The device of aspect 14, wherein: the third patterned metal layer and the seventh patterned metal layer are formed from a same metal.

Aspect 16. The device of any of aspects 14 to 15, further comprising a fifth dielectric layer disposed over the seventh patterned metal layer; and an eighth patterned metal layer disposed over the fifth dielectric layer, wherein the seventh patterned metal layer, the fifth dielectric layer, and the eighth patterned metal layer form a fifth capacitor.

Aspect 17. The device of any of aspects 1 to 16, further comprising: a heating element control system configured to provide the electrical power to the first patterned metal layer to control heating of the first patterned metal layer.

Aspect 18. A method of forming a moisture sensor, comprising: forming a first patterned metal layer overlying a substrate; forming a first dielectric layer over the first patterned metal layer; forming a second patterned metal layer over the first dielectric layer; forming a second moisture-sensitive dielectric layer over the second patterned metal layer; and forming a third patterned metal layer over the second moisture-sensitive dielectric layer, wherein the first patterned metal layer, the first dielectric layer, and the second patterned metal layer form a first capacitor, the third patterned metal layer, the second moisture-sensitive dielectric layer, and the second patterned metal layer form a second capacitor, the second patterned metal layer is shared with the first capacitor, and the first patterned metal layer is further configured for connection to electrical power as a heating element to assist in removing moisture from the second moisture-sensitive dielectric layer of the second capacitor.

Aspect 19. The method of aspect 18, further comprising: connecting a first frequency-sensitive circuit with the first capacitor and the second capacitor, wherein the first frequency-sensitive circuit has a first frequency response that changes based at least on a variable capacitance value of the second capacitor resulting from exposure of the second moisture-sensitive dielectric layer to moisture.

Aspect 20. The method of any of aspects 18 to 19, wherein the first dielectric layer is formed from a moisture-insensitive dielectric material.

Aspect 21. The method of aspect 18, wherein: the first dielectric layer is formed as a moisture-sensitive dielectric layer to form the first capacitor as a moisture-sensitive capacitor.

Aspect 22. The method of any of aspects 18 to 21, further comprising: connecting a heating control circuit to provide the electrical power to the first patterned metal layer to control heating of the first patterned metal layer.

Aspect 23. The method of any of aspects 18 to 22, further comprising: forming a fourth patterned metal layer disposed coplanar with the first patterned metal layer, wherein the first patterned metal layer and the fourth patterned metal layer are formed from a same metal; forming a third dielectric layer disposed over the fourth patterned metal layer and coplanar with the first dielectric layer; forming a fifth patterned metal layer disposed over the third dielectric layer and coplanar with the second patterned metal layer; forming a fourth dielectric layer disposed over the fifth patterned metal layer and coplanar with the second moisture-sensitive dielectric layer; and forming a sixth patterned metal layer disposed over the fourth dielectric layer and coplanar with the third patterned metal layer, wherein the fourth patterned metal layer, the third dielectric layer, and the fifth patterned metal layer form a third capacitor, and the sixth patterned metal layer, the fourth dielectric layer, and the fifth patterned metal layer form a fourth capacitor in which the fifth patterned metal layer is shared with the third capacitor.

Aspect 24. The method of aspect 23, wherein: the first dielectric layer, the third dielectric layer, and the fourth dielectric layer are formed from a moisture-insensitive dielectric material.

Aspect 25. The method of aspect 23, wherein: the fourth dielectric layer is formed from a same moisture-sensitive dielectric material as the second moisture-sensitive dielectric layer to form the fourth capacitor as a moisture-sensitive capacitor.

Aspect 26. The method of aspect 25, wherein: the first dielectric layer and the third dielectric layer are formed from a same moisture-insensitive dielectric material.

Aspect 27. The method of any of aspects 23 to 26, further comprising: forming an isolating structure that separates the first capacitor and the second capacitor from the third capacitor and the fourth capacitor, wherein the isolating structure includes a dielectric material, and wherein the dielectric material further includes an air gap formed therein to further isolate the first capacitor and the second capacitor from the third capacitor and the fourth capacitor.

Aspect 28. A moisture sensor, comprising: a first capacitor having a first patterned metal layer, a first dielectric layer disposed over the first patterned metal layer, and a second patterned metal layer disposed over the first dielectric layer; a second capacitor having a second moisture-sensitive dielectric layer disposed over the second patterned metal layer, and a third patterned metal layer disposed over the second moisture-sensitive dielectric layer, wherein the second patterned metal layer is shared with the first capacitor; a first frequency-sensitive circuit formed using at least the first capacitor and the second capacitor, wherein the first frequency-sensitive circuit has a first frequency response that changes based at least on a variable capacitance value of the second capacitor resulting from exposure of the second moisture-sensitive dielectric layer to moisture; and a heating control circuit configured to provide electrical power to the first patterned metal layer to control heating of the first patterned metal layer to assist in removing moisture from the second moisture-sensitive dielectric layer of the second capacitor.

Aspect 29. The moisture sensor of aspect 28, wherein: the first dielectric layer is formed from a same moisture-sensitive dielectric material as the second moisture-sensitive dielectric layer.

Aspect 30. The moisture sensor of any of aspects 28 to 29, further comprising: a third capacitor having a fourth patterned metal layer coplanar with the first patterned metal layer, a third dielectric layer disposed over the fourth patterned metal layer and coplanar with the first dielectric layer, and a fifth patterned metal layer disposed over the third dielectric layer and coplanar with the second patterned metal layer; and a fourth capacitor having a fourth moisture-sensitive dielectric layer disposed over the fifth patterned metal layer and coplanar with the second moisture-sensitive dielectric layer, and a sixth patterned metal layer disposed over the fourth moisture-sensitive dielectric layer, wherein the fifth patterned metal layer is shared with the third capacitor.

Aspect 31. The moisture sensor of aspect 30, wherein: the first frequency-sensitive circuit is further formed using the third capacitor and the fourth capacitor.

Aspect 32. The moisture sensor of aspect 31, wherein: the fourth moisture-sensitive dielectric layer is formed from a same moisture-sensitive dielectric material as the second moisture-sensitive dielectric layer.

Aspect 33. The moisture sensor of aspect 32, wherein: the first frequency response changes based at least on variable capacitance values of the second capacitor and the fourth capacitor resulting from exposure of the second moisture-sensitive dielectric layer and the fourth moisture-sensitive dielectric layer to moisture.

Aspect 34. The moisture sensor of any of aspects 30 to 33, further comprising: an isolating dielectric material separating the first capacitor and the second capacitor from the third capacitor and the fourth capacitor, wherein the isolating dielectric material includes an air gap formed therein to further isolate the first capacitor and the second capacitor from the third capacitor and the fourth capacitor.

It is noted that the figures in the disclosure may represent actual representations and/or conceptual representations of various parts, components, objects, devices, packages, integrated devices, integrated circuits, and/or transistors. In some instances, the figures may not be to scale. In some instances, for purpose of clarity, not all components and/or parts may be shown. In some instances, the position, the location, the sizes, and/or the shapes of various parts and/or components in the figures may be exemplary. In some implementations, various components and/or parts in the figures may be optional.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling (e.g., mechanical coupling) between two objects. For example, if object A physically touches object B, and object B touches object C, then objects A and C may still be considered coupled to one another—even if they do not directly physically touch each other. The term "electrically coupled" may mean that two objects are directly or indirectly coupled together such that an electrical current (e.g., signal, power, ground) may travel between the two objects. Two objects that are electrically coupled may or may not have an electrical current traveling between the two objects. The use of the terms "first", "second", "third" and "fourth" (and/or anything above fourth) is arbitrary. Any of the components described may be the first component, the second component, the third component or the fourth component. For example, a component that is referred to a second component, may be the first component, the second component, the third component or the fourth component. The term "encapsulating" means that the object may partially encapsulate or completely encapsulate another object. The terms "top" and "bottom" are arbitrary. A component that is located on top may be located over a component that is located on a bottom. A top component may be considered a bottom component, and vice versa. As described in the disclosure, a first component that is located "over" a second component may mean that the first component is located above or below the second component, depending on how a bottom or top is arbitrarily defined. In another example, a first component may be located over (e.g., above) a first surface of the second component, and a third component may be located over (e.g., below) a second surface of the second component, where the second surface is opposite to the first surface. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. A first component that is located "in" a second component may be partially located in the second component or completely located in the second component. The term "about 'value X'", or "approximately value X", as used in the disclosure means within 10 percent of the 'value X'. For example, a value of about 1 or approximately 1, would mean a value in a range of 0.9-1.1.

In some implementations, an interconnect is an element or component of a device or package that allows or facilitates an electrical connection between two points, elements and/or components. In some implementations, an interconnect may include a trace, a via, a pad, a pillar, a metallization layer, a redistribution layer, and/or an under bump metallization (UBM) layer/interconnect. In some implementations, an interconnect may include an electrically conductive material that may be configured to provide an electrical path for a signal (e.g., a data signal), ground and/or power. An interconnect may include more than one element or component. An interconnect may be defined by one or more interconnects. An interconnect may include one or more metal layers. An interconnect may be part of a circuit. Different implementations may use different processes and/or sequences for forming the interconnects. In some implementations, a chemical vapor deposition (CVD) process, a physical vapor deposition (PVD) process, a sputtering process, a spray coating, and/or a plating process may be used to form the interconnects.

Also, it is noted that various disclosures contained herein may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

In the detailed description above, it can be seen that different features are grouped together in examples. This manner of disclosure should not be understood as an intention that the example aspects have more features than are explicitly mentioned in each aspect. Rather, the various aspects of the disclosure may include fewer than all features of an individual example aspect disclosed. Therefore, the following aspects should hereby be deemed to be incorporated in the description, wherein each aspect by itself can stand as a separate example. Although each dependent aspect can refer in the aspects to a specific combination with one of the other aspects, the aspect(s) of that dependent aspect are not limited to the specific combination. It will be appreciated that other example aspects can also include a combination of the dependent aspect aspect(s) with the subject matter of any other dependent aspect or independent aspect or a combination of any feature with other dependent and independent aspects. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a aspect can be included in any other independent aspect, even if the aspect is not directly dependent on the independent aspect.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A device comprising:
a first patterned metal layer;
a first dielectric layer disposed over the first patterned metal layer;
a second patterned metal layer disposed over the first dielectric layer, wherein the first patterned metal layer, the first dielectric layer, and the second patterned metal layer form a first capacitor;
a second moisture-sensitive dielectric layer disposed over the second patterned metal layer; and
a third patterned metal layer disposed over the second moisture-sensitive dielectric layer, wherein
the third patterned metal layer, the second moisture-sensitive dielectric layer, and the second patterned metal layer form a second capacitor,
the second patterned metal layer is shared with the first capacitor, and
the first patterned metal layer is further configured for connection to electrical power as a heating element to assist in removing moisture from the second moisture-sensitive dielectric layer of the second capacitor.

2. The device of claim 1, further comprising:
a first frequency-sensitive circuit formed using at least the first capacitor and the second capacitor, wherein the first frequency-sensitive circuit has a first frequency response that changes based at least on a variable capacitance value of the second capacitor resulting from exposure of the second moisture-sensitive dielectric layer to moisture.

3. The device of claim 2, wherein:
the first dielectric layer is formed from a moisture-insensitive dielectric material; and
the first capacitor is configured as a first reference capacitor in the first frequency-sensitive circuit.

4. The device of claim 1, wherein:
the first dielectric layer is formed as a moisture-sensitive dielectric layer to form the first capacitor as a moisture-sensitive capacitor.

5. The device of claim 4, further comprising:
a second frequency-sensitive circuit formed using the first capacitor and the second capacitor, wherein the second frequency-sensitive circuit has a second frequency response that changes based at least on variable capacitance values of the first capacitor and the second capacitor resulting from exposure of the first dielectric layer and the second moisture-sensitive dielectric layer to moisture.

6. The device of claim 1, further comprising:
a fourth patterned metal layer disposed coplanar with the first patterned metal layer, wherein the first patterned metal layer and the fourth patterned metal layer are formed from a same metal;
a third dielectric layer disposed over the fourth patterned metal layer and coplanar with the first dielectric layer;
a fifth patterned metal layer disposed over the third dielectric layer and coplanar with the second patterned metal layer, wherein the fourth patterned metal layer, the third dielectric layer, and the fifth patterned metal layer form a third capacitor;
a fourth dielectric layer disposed over the fifth patterned metal layer and coplanar with the second moisture-sensitive dielectric layer; and
a sixth patterned metal layer disposed over the fourth dielectric layer and coplanar with the third patterned metal layer, wherein the sixth patterned metal layer, the fourth dielectric layer, and the fifth patterned metal layer form a fourth capacitor in which the fifth patterned metal layer is shared with the third capacitor.

7. The device of claim 6, wherein:
the first dielectric layer, the third dielectric layer, and the fourth dielectric layer are formed from a moisture-insensitive dielectric material.

8. The device of claim 6, further comprising:
a third frequency-sensitive circuit formed using the first capacitor, the second capacitor, the third capacitor, and the fourth capacitor, wherein the third frequency-sensitive circuit has a third frequency response that changes based at least on a variable capacitance value of the second capacitor resulting from exposure of the second moisture-sensitive dielectric layer to moisture.

9. The device of claim 6, wherein:
the fourth dielectric layer is formed from a same moisture-sensitive dielectric material as the second moisture-sensitive dielectric layer to form the fourth capacitor as a moisture-sensitive capacitor.

10. The device of claim 9, further comprising:
a fourth frequency-sensitive circuit formed using the first capacitor, the second capacitor, the third capacitor, and the fourth capacitor, wherein the fourth frequency-sensitive circuit has a fourth frequency response that changes based at least on variable capacitance values of the second capacitor and the fourth capacitor resulting from exposure of the second moisture-sensitive dielectric layer and the fourth dielectric layer to moisture.

11. The device of claim 10, wherein:
the first dielectric layer and the third dielectric layer are formed from a same moisture-insensitive dielectric material; and
the first capacitor and the third capacitor are configured as reference capacitors in the fourth frequency-sensitive circuit.

12. The device of claim 6, wherein:
the first capacitor and the second capacitor are separated from the third capacitor and the fourth capacitor by an isolating structure formed from a dielectric material, wherein the dielectric material includes an air gap therein to further isolate the first capacitor and the second capacitor from the third capacitor and the fourth capacitor.

13. The device of claim 1, wherein:
the third patterned metal layer is further configured for connection to the electrical power as a further heating element to assist in removing moisture from the second moisture-sensitive dielectric layer of the second capacitor.

14. The device of claim 1, further comprising:
a seventh patterned metal layer disposed over the third patterned metal layer, wherein the seventh patterned metal layer is further configured for connection to the electrical power as a further heating element.

15. The device of claim 14, wherein:
the third patterned metal layer and the seventh patterned metal layer are formed from a same metal.

16. The device of claim 14, further comprising
a fifth dielectric layer disposed over the seventh patterned metal layer; and
an eighth patterned metal layer disposed over the fifth dielectric layer, wherein the seventh patterned metal layer, the fifth dielectric layer, and the eighth patterned metal layer form a fifth capacitor.

17. The device of claim 1, further comprising:
a heating element control system configured to provide the electrical power to the first patterned metal layer to control heating of the first patterned metal layer.

18. A method of forming a moisture sensor, comprising:
forming a first patterned metal layer overlying a substrate;
forming a first dielectric layer over the first patterned metal layer;
forming a second patterned metal layer over the first dielectric layer;
forming a second moisture-sensitive dielectric layer over the second patterned metal layer; and
forming a third patterned metal layer over the second moisture-sensitive dielectric layer,
wherein
the first patterned metal layer, the first dielectric layer, and the second patterned metal layer form a first capacitor,
the third patterned metal layer, the second moisture-sensitive dielectric layer, and the second patterned metal layer form a second capacitor,
the second patterned metal layer is shared with the first capacitor, and
the first patterned metal layer is further configured for connection to electrical power as a heating element to assist in removing moisture from the second moisture-sensitive dielectric layer of the second capacitor.

19. The method of claim 18, further comprising:
connecting a first frequency-sensitive circuit with the first capacitor and the second capacitor, wherein the first frequency-sensitive circuit has a first frequency response that changes based at least on a variable capacitance value of the second capacitor resulting from exposure of the second moisture-sensitive dielectric layer to moisture.

20. The method of claim 18, wherein
the first dielectric layer is formed from a moisture-insensitive dielectric material.

21. The method of claim 18, wherein:
the first dielectric layer is formed as a moisture-sensitive dielectric layer to form the first capacitor as a moisture-sensitive capacitor.

22. The method of claim 18, further comprising:
connecting a heating control circuit to provide the electrical power to the first patterned metal layer to control heating of the first patterned metal layer.

23. The method of claim 18, further comprising:
forming a fourth patterned metal layer disposed coplanar with the first patterned metal layer, wherein the first patterned metal layer and the fourth patterned metal layer are formed from a same metal;
forming a third dielectric layer disposed over the fourth patterned metal layer and coplanar with the first dielectric layer;
forming a fifth patterned metal layer disposed over the third dielectric layer and coplanar with the second patterned metal layer;
forming a fourth dielectric layer disposed over the fifth patterned metal layer and coplanar with the second moisture-sensitive dielectric layer; and
forming a sixth patterned metal layer disposed over the fourth dielectric layer and coplanar with the third patterned metal layer,
wherein
the fourth patterned metal layer, the third dielectric layer, and the fifth patterned metal layer form a third capacitor, and
the sixth patterned metal layer, the fourth dielectric layer, and the fifth patterned metal layer form a fourth capacitor in which the fifth patterned metal layer is shared with the third capacitor.

24. The method of claim 23, wherein:
the first dielectric layer, the third dielectric layer, and the fourth dielectric layer are formed from a moisture-insensitive dielectric material.

25. The method of claim 23, wherein:
the fourth dielectric layer is formed from a same moisture-sensitive dielectric material as the second moisture-sensitive dielectric layer to form the fourth capacitor as a moisture-sensitive capacitor.

26. The method of claim 25, wherein:
the first dielectric layer and the third dielectric layer are formed from a same moisture-insensitive dielectric material.

27. The method of claim 23, further comprising:
forming an isolating structure that separates the first capacitor and the second capacitor from the third capacitor and the fourth capacitor, wherein the isolating structure includes a dielectric material, and wherein the dielectric material further includes an air gap formed therein to further isolate the first capacitor and the second capacitor from the third capacitor and the fourth capacitor.

28. A moisture sensor, comprising:
a first capacitor having a first patterned metal layer, a first dielectric layer disposed over the first patterned metal layer, and a second patterned metal layer disposed over the first dielectric layer;
a second capacitor having a second moisture-sensitive dielectric layer disposed over the second patterned metal layer, and a third patterned metal layer disposed over the second moisture-sensitive dielectric layer, wherein the second patterned metal layer is shared with the first capacitor;
a first frequency-sensitive circuit formed using at least the first capacitor and the second capacitor, wherein the first frequency-sensitive circuit has a first frequency response that changes based at least on a variable capacitance value of the second capacitor resulting from exposure of the second moisture-sensitive dielectric layer to moisture; and
a heating control circuit configured to provide electrical power to the first patterned metal layer to control heating of the first patterned metal layer to assist in removing moisture from the second moisture-sensitive dielectric layer of the second capacitor.

29. The moisture sensor of claim 28, wherein:
the first dielectric layer is formed from a same moisture-sensitive dielectric material as the second moisture-sensitive dielectric layer.

30. The moisture sensor of claim 28, further comprising:
a third capacitor having a fourth patterned metal layer coplanar with the first patterned metal layer, a third dielectric layer disposed over the fourth patterned metal layer and coplanar with the first dielectric layer, and a fifth patterned metal layer disposed over the third dielectric layer and coplanar with the second patterned metal layer; and
a fourth capacitor having a fourth moisture-sensitive dielectric layer disposed over the fifth patterned metal layer and coplanar with the second moisture-sensitive dielectric layer, and a sixth patterned metal layer disposed over the fourth moisture-sensitive dielectric layer, wherein the fifth patterned metal layer is shared with the third capacitor.

31. The moisture sensor of claim 30, wherein:
the first frequency-sensitive circuit is further formed using the third capacitor and the fourth capacitor.

32. The moisture sensor of claim 31, wherein:
the fourth moisture-sensitive dielectric layer is formed from a same moisture-sensitive dielectric material as the second moisture-sensitive dielectric layer.

33. The moisture sensor of claim 32, wherein:
the first frequency response changes based at least on variable capacitance values of the second capacitor and the fourth capacitor resulting from exposure of the second moisture-sensitive dielectric layer and the fourth moisture-sensitive dielectric layer to moisture.

34. The moisture sensor of claim 30, further comprising:
an isolating dielectric material separating the first capacitor and the second capacitor from the third capacitor and the fourth capacitor, wherein the isolating dielectric material includes an air gap formed therein to further isolate the first capacitor and the second capacitor from the third capacitor and the fourth capacitor.

* * * * *